US008949087B2

(12) United States Patent
Oliverius et al.

(10) Patent No.: US 8,949,087 B2
(45) Date of Patent: Feb. 3, 2015

(54) SYSTEM AND METHOD FOR STRUCTURAL ANALYSIS

(75) Inventors: Matthew Joseph Oliverius, Everett, WA (US); Naveena Mallikarjunaiah, Everett, WA (US); Mel Eshghi, Bellevue, WA (US); Chandrashekar Ramachandran, Everett, WA (US); Venkata Narasimha Ravi Udali, Everett, WA (US)

(73) Assignee: The Boeing Company, Chicago, IL (US)

( * ) Notice: Subject to any disclaimer, the term of this patent is extended or adjusted under 35 U.S.C. 154(b) by 442 days.

(21) Appl. No.: 13/409,771

(22) Filed: Mar. 1, 2012

(65) Prior Publication Data

US 2013/0231898 A1    Sep. 5, 2013

(51) Int. Cl.
*G06F 17/50* (2006.01)

(52) U.S. Cl.
CPC ........ *G06F 17/5095* (2013.01); *G06F 2217/46* (2013.01); *G06F 2217/76* (2013.01); *G06F 17/5018* (2013.01)
USPC .................................................. 703/2; 703/1

(58) Field of Classification Search
None
See application file for complete search history.

(56) References Cited

U.S. PATENT DOCUMENTS

| | | | | |
|---|---|---|---|---|
| 5,006,990 A * | 4/1991 | Ward et al. | ....................... | 700/97 |
| 5,071,492 A * | 12/1991 | Parker et al. | .................. | 148/517 |
| 6,125,333 A | 9/2000 | Pun | | |
| 6,341,261 B1 * | 1/2002 | Vasey-Glandon et al. | ........ | 703/6 |
| 6,799,463 B2 | 10/2004 | Fields | | |
| 6,813,749 B2 * | 11/2004 | Rassaian | ........................... | 703/7 |
| 6,974,633 B2 * | 12/2005 | Garratt et al. | ................. | 428/598 |
| 7,010,472 B1 * | 3/2006 | Vasey-Glandon et al. | ........ | 703/6 |
| 7,613,527 B2 * | 11/2009 | Raby et al. | ...................... | 700/17 |
| 7,809,454 B2 * | 10/2010 | Hu et al. | ......................... | 700/97 |
| 7,889,840 B2 * | 2/2011 | Vasudevan et al. | ............. | 378/58 |
| 8,108,058 B2 * | 1/2012 | Murrish et al. | .................. | 700/97 |
| 8,401,827 B2 * | 3/2013 | Patnala | ............................. | 703/2 |
| 2003/0088373 A1 * | 5/2003 | Fields et al. | .................... | 702/42 |
| 2004/0044504 A1 | 3/2004 | Shimizu | | |
| 2005/0144088 A1 * | 6/2005 | Croke et al. | .................... | 705/26 |
| 2005/0256602 A1 * | 11/2005 | Tsao et al. | .................... | 700/121 |
| 2006/0089823 A1 | 4/2006 | Meyer et al. | | |
| 2009/0138247 A1 * | 5/2009 | Chow | ................................ | 703/2 |
| 2010/0098131 A1 * | 4/2010 | Ahlers et al. | ...................... | 374/8 |
| 2010/0204815 A1 * | 8/2010 | Murrish et al. | ................. | 700/98 |
| 2010/0318327 A1 * | 12/2010 | Holden et al. | .................... | 703/1 |

OTHER PUBLICATIONS

Chintapalli et al., "The development of a preliminary structural design optimization method of an aircraft wing-box skin-stringer panels", Aerospace Science and Technology, Elsevier Masson, FR, vol. 14. No. 3, Apr. 1, 2010 , pp. 188-198.

(Continued)

*Primary Examiner* — Kibrom K Gebresilassie

(57) ABSTRACT

A method of analyzing a structural component may include the step of storing one or more of the following on a server: at least one material allowable for a structural component, at least one load case for the structural component, and at least one analysis template having at least one analysis variable. The method may further include the step of providing, using an interface, at least one entry for the analysis variable. The method may further include performing, using a processor-based structural component analyzer, a strength analysis of the structural component using the analysis template and based on the load case and the entry for the analysis variable. The method may further include determining, using the analyzer, a margin of safety of the structural component based on the material allowable.

22 Claims, 16 Drawing Sheets

(56) References Cited

OTHER PUBLICATIONS

Hansen et al, "Multilevel optimization in aircraft structural design evaluation", Computers and Structures, Pergamon Press, GB, vol. 86. No. 1-2, Dec. 15, 2007, pp. 104-118.

Ledermann et al., "Dynamic CAD objects for structural optimization in preliminary aircraft design"., Aerospace Science and Technology. Elsevier Masson, FR, vol. 10, No. 7, Aug. 24, 2006, pp. 601-610.
European Search Report for EP13157412 dated Aug. 19, 2013.
European Search Report for EP13157412 dated Jun. 14, 2013.

* cited by examiner

| LOCATION 268 | CRITICAL MS 130 | COMPONENT 258 | FAILURE MODE 132 | LOAD CASE 18 | ENVIRONMENT |
|---|---|---|---|---|---|
| 120.9 | X.XX | BEAM | BUCKLING | L0004 | 70°F |
| 160.3 | X.XX | BEAM | BUCKLING | L0004 | 70°F |
| 208.4 | X.XX | BEAM | BUCKLING | L0004 | 70°F |
| 236.6 | X.XX | BEAM | BUCKLING | L0004 | 70°F |
| 287.2 | X.XX | BEAM | BUCKLING | L0004 | 70°F |
| 287.3 | X.XX | FASTENER | SHEAR/TENSION | L0004 | 70°F |

SYSTEM AND METHOD FOR STRUCTURAL ANALYSIS

FIELD

The present disclosure relates generally to structural design and, more particularly, to the strength analysis and optimization of a structural component.

BACKGROUND

Aircraft design typically includes developing a preliminary set of loads that the aircraft may be subjected to during service. Such loads may include static loads such as steady-state bending loads on a wing or a fuselage of the aircraft during cruise flight and other steady-state loads at other locations of the aircraft. The loads may also include fatigue loads such as the rapid loading and unloading of the wings that may occur when the aircraft encounters turbulence, the changing pressurization loads on the fuselage during each flight cycle, and other fluctuating or cyclic loading of the aircraft structure. During the design of the aircraft, the loads may be applied to a model of the aircraft structure during a strength analysis of the structure in order to size the structural components.

Conventional practices for aircraft design typically include manually performing the strength analysis. Unfortunately, manual performance of the strength analysis is a time-consuming process. For example, during the design process, the loads may be revised as the operating environment and the flight conditions (e.g., mass distribution, aerodynamics) of the aircraft become more refined. The strength analysis methods and material allowables used in analyzing the structural components may also be updated during the design process. Each revision in the loads, the analysis methods, and/or the material allowables may require an update of the strength analyses to determine if re-sizing of the structural components is necessary. As may be appreciated, manually updating the strength analysis for each structural component may significantly impact the design schedule. Furthermore, manually performing the strength analysis may lead to an over-designed structure that may not be weight-optimized.

The above-noted drawbacks associated with conventional design practices may be compounded for aircraft structures that are divided into individual subassemblies which may be detail-designed and manufactured by different suppliers. For example, the aircraft fuselage may be divided into several barrel sections. Each barrel section may be assigned to a different supplier for the detail design and manufacture of the barrel section. Although each barrel section may share common features such as the structure surrounding each passenger door, each supplier may have some unique aspects to their strength analysis methodology for analyzing local details and designing the passenger door surrounding structure. The differences in the analysis methodologies of the suppliers may lead to inconsistencies in the detail design of common features in the different barrel sections. Such inconsistencies may result in certain barrel sections being over-designed which may result in an overweight fuselage.

For complex structures such as commercial aircraft, the design process may involve hundreds of strength analysts analyzing thousands of different structural components. In conventional practice, each analyst may perform a strength analysis of several structural components using their own unique analysis methodologies or templates. The use of numerous analysis templates for analyzing thousands of structural components may result in significant inconsistencies in the analysis results such as significant inconsistencies in the margins of safety for substantially similar structural components. For a complex structure with large quantities of structural components, the cumulative effect of such inconsistencies may be a structure that may be unnecessarily overweight. In addition, verification and certification of the numerous strength analyses may be an extremely cumbersome and time-consuming process due to the differences between the different analysis templates used by the individual analysts.

As can be seen, there exists a need in the art for a system and method for reducing the amount of time required for performing the strength analysis of a structure. In addition, there exists a need in the art for a system and method for performing a strength analysis which minimizes the weight of the structure. Even further, there exists a need in the art for a system and method for improving the consistency or repeatability of strength analysis methodologies for structures designed and manufactured by different suppliers. Preferably, such system and method may be performed in a cost-effective manner.

SUMMARY

The above-noted needs associated with strength analysis of a structure are specifically addressed by the present disclosure which provides a system and method of analyzing structural components on a controlled-access server using predefined and controlled strength analysis templates and material allowables. The system and method may allow multiple users to analyze structural components via the controlled-access server in a highly consistent manner by reducing the quantity of strength analysis templates to several highly-controlled templates. In addition, the system may generate a strength analysis output and an optimization output for each structural component. The analysis output and optimization output may be generated in an automated manner and in a standard format which may simplify the analysis verification process.

For example, the system may generate strength analysis results including margins of safety, corresponding failure modes, and related environment data and wherein the margins of safety are highly consistent and repeatable for each structural component of a structural assembly. In addition, the system may significantly reduce the amount of time required for analysis and optimization of the structural components. The strength analysis output and optimization output should be reviewed by a stress analyst and/or a design engineer for structural validity and design functionality. The user of the system is responsible and/or accountable for the analysis. Advantageously, the system may avoid overly-conservative configurations of the structural component and may instead provide a highly weight-optimized structural component and a highly weight-optimized structural assembly. The system may also reduce the time and expense associated with auditing and certifying the strength analysis reports by reducing the numerous different strength analysis templates used in conventional design practices down to several highly-controlled analysis templates as implemented in the present system.

In an embodiment, the method may include the step of storing on a controlled-access server at least one material allowable, at least one load case for the structural component, and at least one analysis template having at least one analysis variable. The method may further include the step of providing at least one entry for the analysis variable using an interface to the server. The interface to the server may be displayed on or provided by a computer or other device that may be remotely located from and communicatively coupled to the server. The method may further include performing, using a processor-based structural component analyzer, a strength analysis of the structural component using the analysis template and based on the load case and the entry for the analysis variable. The method may additionally include determining, using the analyzer, a margin of safety of the structural component based on the material allowable. The analysis template may be unalterable using the interface such that for each entry for the analysis variable, the analyzer determines a consistent value for the margin of safety of the structural component.

In a further embodiment, disclosed is a method for analyzing and optimizing a structural component. The method may include storing on a controlled-access server a plurality of material allowables for the structural component, a plurality of load cases for the structural component, and a plurality of analysis templates each having at least one analysis variable. The method may additionally include the step of providing at least one entry for the analysis variable using the interface to the server. The method may further include performing, using a structural component analyzer, a strength analysis of the structural component using one or more of the analysis templates and based on at least one load case and at least one entry for the analysis variable.

The method may additionally include determining, using a structural component analyzer, a margin of safety of the structural component based on the material allowable. The method may further include selecting, using the interface, at least one design variable of the structural component for optimization thereof. At least one constraint of the structural component may be entered into a structural component optimizer using the interface. The method may further include performing an optimization of the design variable by iteratively updating the design variable until the constraint is substantially satisfied, and determining, using the optimizer, an optimized geometry of the structural component based on the optimization of the design variable.

Also disclosed is a system for analyzing a structural component comprising a controlled-access server, an interface to the server, and a structural component analyzer. The server may be configured to store at least one of the following: at least one load case for the structural component, at least one material allowable, and at least one analysis template having at least one analysis variable. The interface may be configured to facilitate the providing of at least one entry for the analysis variable. The structural component analyzer may be configured to perform a strength analysis of the structural component using the analysis template based on the load case and the entry for the analysis variable. The structural component analyzer may determine a margin of safety of the structural component based on the material allowable. The analysis template may be unalterable using the interface such that for each entry for the analysis variable, the analyzer determines a consistent value for the margin of safety of the structural component.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
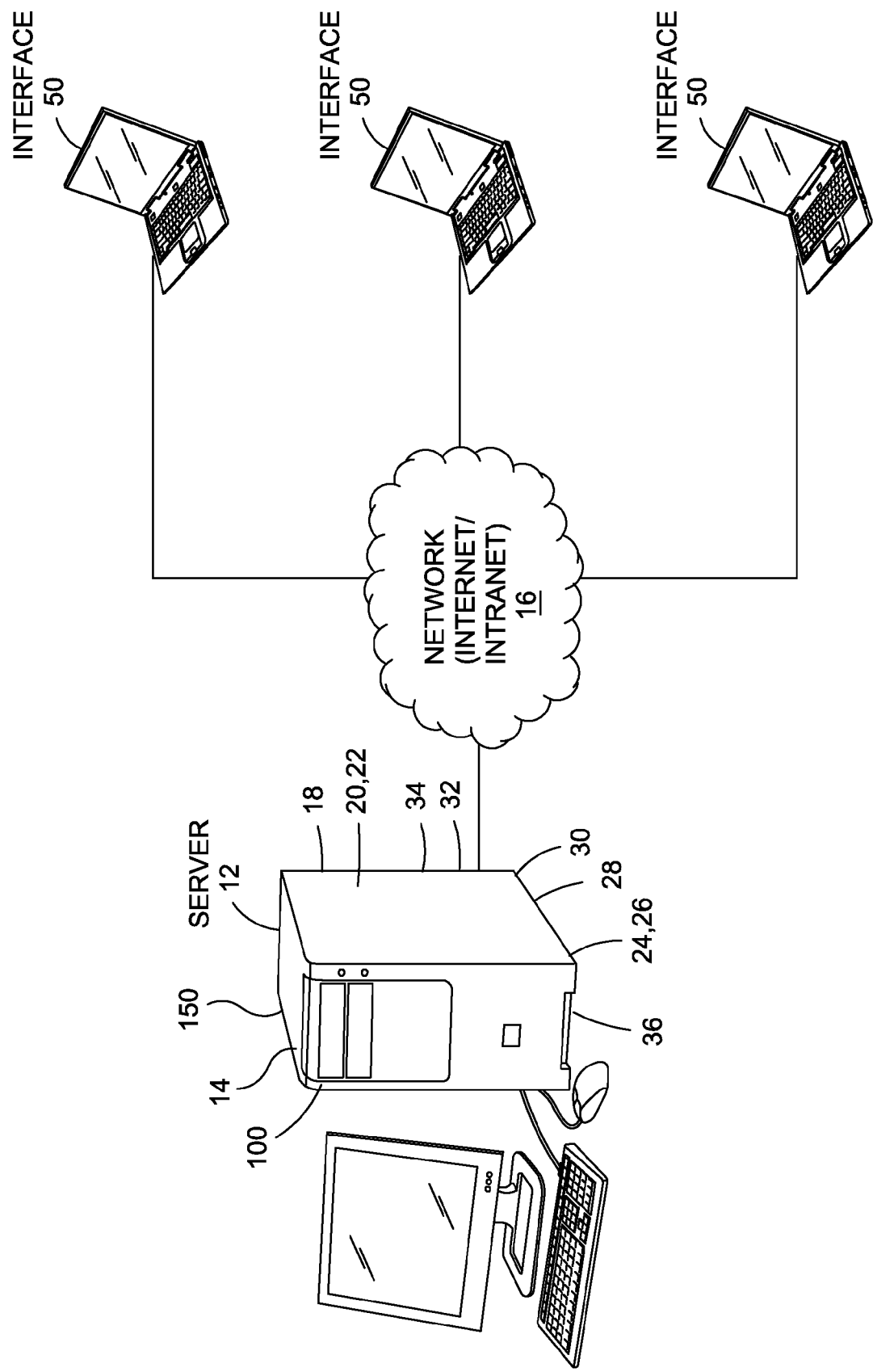
FIG. 1 is a schematic illustration of an embodiment of a processor-based system for analyzing a structural component and including one or more interfaces communicatively coupled to a controlled-access server via a network.
Figure 7:
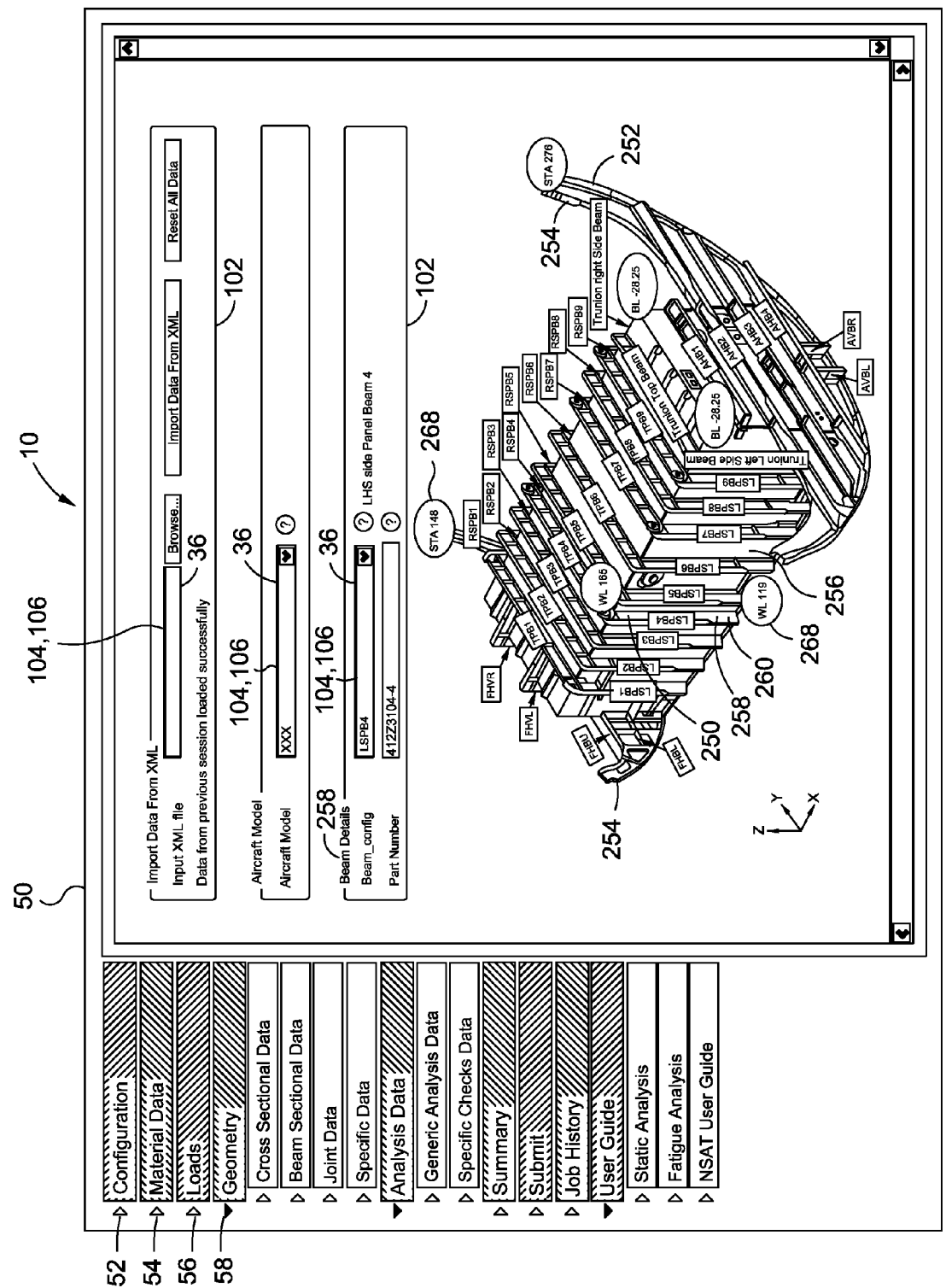
FIG. 7 is an illustration of an embodiment of the interface for providing at least one entry for one or more analysis variables of an analysis template for performing an analysis of one or more structural components for one or more aircraft configurations and further illustrating a structural assembly that may include one or more structural components that may be analyzed using the system and methods disclosed herein.

Referring now to the drawings wherein the showings are for purposes of illustrating preferred and various embodiments of the disclosure, shown in FIG. 1 is a schematic illustration of a system 10 that may be used for analyzing and optimizing a structural component 250 (FIG. 7) and/or a structural assembly 252 (FIG. 7). The system 10 may include one or more controlled-access server(s) 12 upon which one or more analysis templates 28 (FIG. 3) may be loaded. Each one of the analysis templates 28 may comprise an analysis methodology in the form of a structural analysis software program or source code for strength analysis and optimization of the structural component 250 or structural assembly 252. One or more load cases 18 (FIG. 3) and a plurality of material allowables 26 (FIG. 3) may also be loaded onto the server 12.

In FIG. 1, the system 10 may include one or more devices such as computers for displaying an interface 50 to the server 12 such as a web interface. The interface 50 may allow one or more users to access the server 12 from any location via a network 16 such as an Internet, an intranet, a private network, or any one of a variety of other networks 16 or other connection means. In this manner, a user, such as a supplier to the manufacturer, may submit data entries 106 (FIG. 3) into the analysis templates 28 (FIG. 3) for strength analysis 206 (FIG. 4), optimization 162 (FIG. 5), and detail design of a structural component 250 (FIG. 7) or a structural assembly 252 (FIG. 7) that the supplier may be supplying to the manufacturer. The system 10 may be configured to generate an analysis output 126 (FIG. 3) and/or an optimization output 168 (FIG. 3) listing one or more margins of safety 130 (FIG. 14) of the structural component 250 or structural assembly 252, the corresponding failure modes 132 (FIG. 15), and/or other results as described in greater detail below.

Referring to FIG. 1, the analysis templates 28, the loads cases 18, and the material allowables 26 may be unalterable by users of the system 10 which may improve the repeatability and consistency of the strength analysis process among different users as discussed below. In this regard, by maintaining the analysis templates 28 (e.g., the source code), the load cases 18, and the material allowables 26 on the controlled-access server 12 (e.g., a web server), and by providing an interface 50 (e.g., a web interface) for one or more users (e.g., one or more suppliers) to execute the analysis templates 28 and the optimization process, the system 10 provides the technical effect of improving the repeatability and consistency of the strength analysis process. For example, by preventing alteration of the analysis templates 28 stored on the server 12, each user advantageously uses the same or substantially similar analysis template 28 for analyzing a given structural component 250 and which may advantageously provide consistent analysis results among users. Such consistent analysis results may include substantially similar margins of safety 130 for a given structural component 250 analyzed by different users using a given load case 18 at a given environment (e.g., temperature). In this regard, preventing the alteration of the analysis templates 28 by storing the templates 28 on the controlled-access server 12 may also eliminate from a design schedule the time otherwise required for each user to develop and run their own analysis templates. In addition, the execution of the analysis templates 28 by different users may also result in a reduction in the weight of a structural assembly 252 comprised of one or more structural components 250. In this regard, the system 10 disclosed herein may avoid inconsistencies and unnecessary weight in structural components 250 which may otherwise occur if users analyze and optimize structural components 250 using their own unique analysis methods. In this regard, the system 10 and methods disclosed herein provide the further technical effect of reducing the amount of time required for auditing and/or verifying the individual strength analyses of each user.

Additionally, the system 10 provides the technical effect of reducing the amount of time required for refining the design of the structural component 250 (FIG. 7) in response to changes to the load cases 18, changes to the analysis templates 28 (i.e., the analysis methods), and/or changes to the material allowables 26. In this regard, for updates to the analysis templates 28 that may occur as the operating environment and the vehicle configuration (e.g., structural assembly) becomes more refined during the design process, re-runs of the strength analyses of structural components 250 may be rapidly performed by users. For example, users may log into the server 12 via the interfaces 50 and may perform multiple re-runs of the strength analysis and weight optimization of one or more structural components 250 in a reduced amount of time compared to conventional (e.g., manual) strength analysis methods. Documentation of the strength analysis re-runs and weight optimization in the form of strength check notes 134 may also be rapidly generated using the system 10 described herein.

Figure 2:
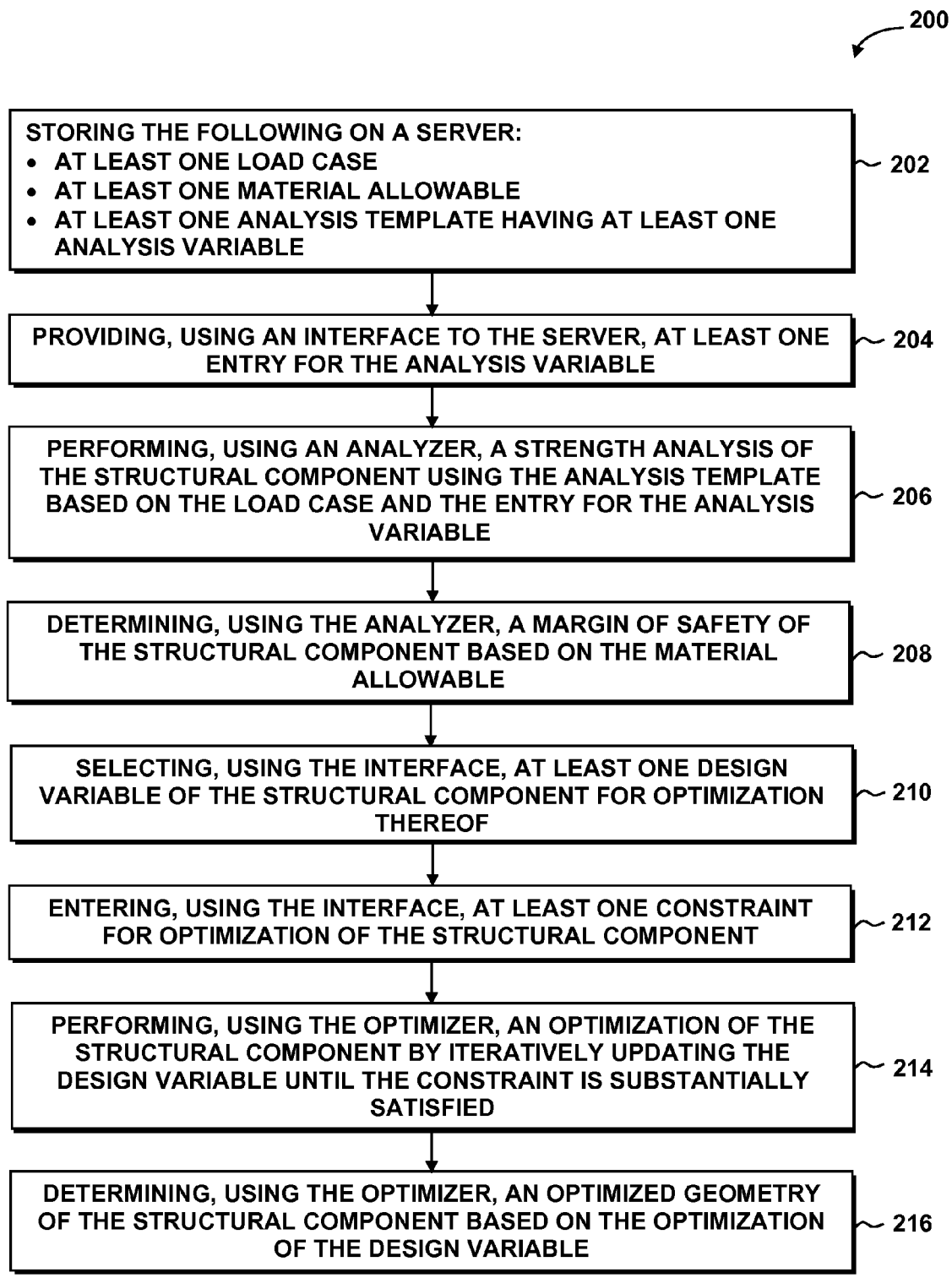
FIG. 2 is a flow chart including one or more operations that may be included in a methodology for analyzing the structural component.

Referring to FIG. 2 and with additional reference to FIGS. 3-16, shown in FIG. 2 is a flow chart of a method 200 including one or more operations that may be implemented for analyzing and/or optimizing a structural component 250 (FIG. 7). Although the system 10 and method disclosed herein is described in the context of a structural component 250, the system 10 and method may also be applied to the analysis and optimization of structural assemblies that may contain one or more structural components 250. The structural component 250 or structural assembly 252 may represent the final component or assembly of an article. Alternatively, the structural component 250 or structural assembly 252 may comprise a subcomponent or a subassembly that may be assembled with other components or subassemblies to form a larger assembly such as an airframe of an aircraft such as the aircraft 500 illustrated in FIG. 6. However, the system 10 and method disclosed herein may be implemented for analyzing and optimizing a structural component 250 or a structural assembly 252 for use in any industry or in any application, without limitation, and is not limited to analysis and optimization of structural components 250 or structural assemblies 252 for aircraft 500.

Figure 3:
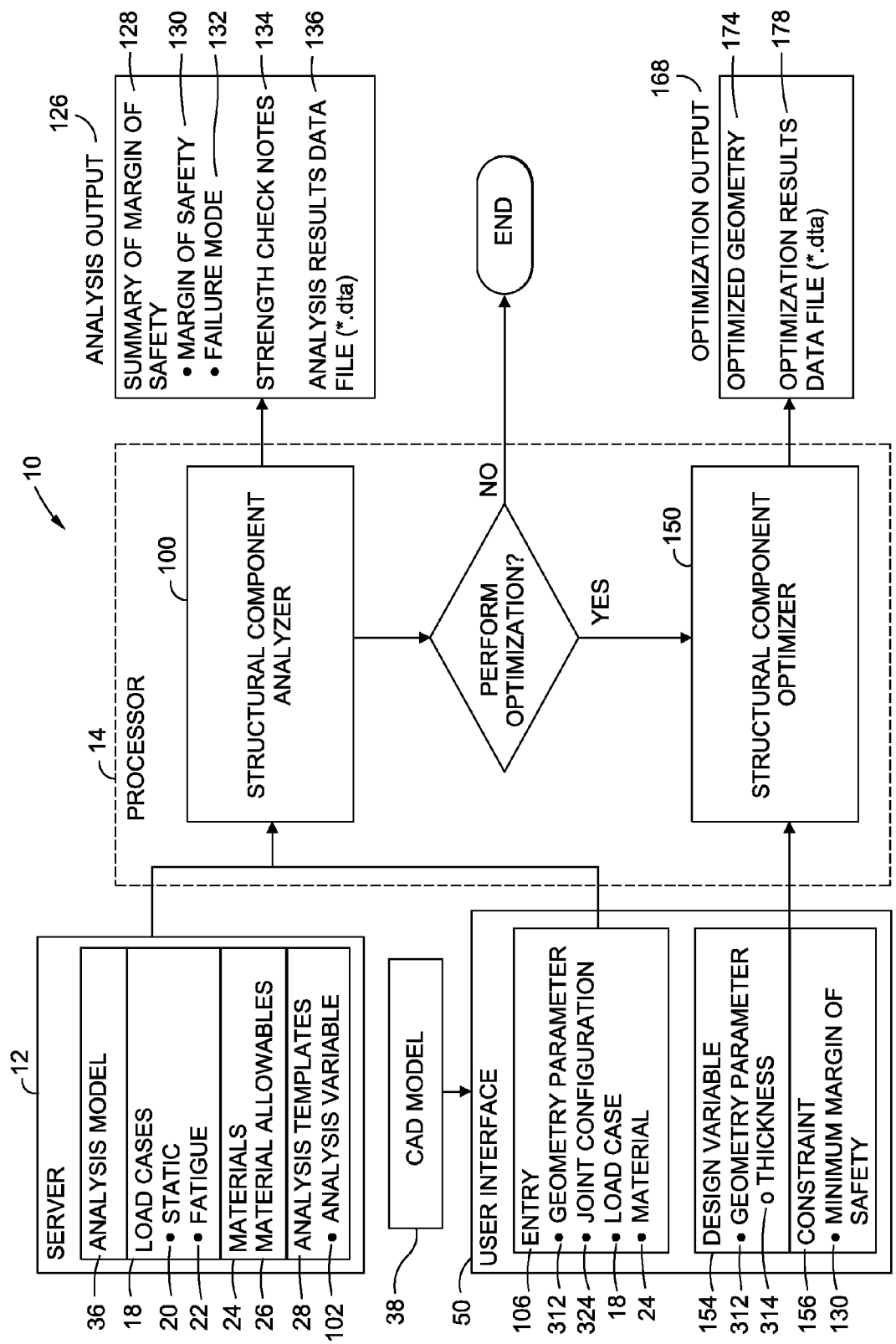
FIG. 3 is a block diagram of an embodiment of the system of FIG. 1 and illustrating a structural component analyzer and a structural component optimizer.

In FIG. 2, Step 202 of the method 200 may initially include storing a plurality of material allowables 26 (FIG. 3) on the server 12 (FIG. 3). The material allowables 26 may be developed by the manufacturer or provided by the manufacturer and may represent the mechanical properties of one or more materials from which the structural component 250 (FIG. 7) may be fabricated. The material allowables 26 may include strength properties of each material in tension, compression, shear, and bearing. For example, the strength properties may include the ultimate tensile strength, yield tensile strength, ultimate shear strength, and other strength properties. Elastic or stiffness properties of the materials such as the modulus of elasticity (i.e., tensile modulus) and the shear modulus of the materials may also be loaded on the server 12 for performing the strength analysis. Additional material properties may also be stored on the server 12 for analyzing and/or optimizing the structural component 250.

Step 202 of the method 200 of FIG. 2 may further include loading a plurality of load cases 18 (FIG. 3) on the server 12. Each load case 18 may represent a set of internal loads which represent the forces and moments to which the structural component 250 (FIG. 7) may be subjected when in service for different loading conditions. For example, in the case of an aircraft, the load cases 18 may include a set of flight loads, a set of ground maneuvering loads, a set of landing loads, a set of cabin pressurization loads, and other loads cases. The load cases 18 may be divided into static loads and fatigue loads, one of which may be selected by a user as an entry 106 (FIG. 3) into the analysis template 28 for respectively performing a static analysis 108 (FIG. 4), a fatigue analysis 116 (FIG. 4), a static optimization 170, and/or a fatigue optimization 172 of the structural component 250 as described below.

The load cases 18 (FIG. 3) may be associated with an analysis model 36 (FIG. 3) or a mathematical model of the structural component 250 (FIG. 7) for simulating the response of the structural component 250 to the application of the loads. The analysis model 36 may comprise a finite element model or may alternatively be defined by a finite difference model, a finite volume model, or any other means for mathematically modeling the structural component 250 to be analyzed. The finite element model may be modeled with various elements such as bar elements, beam elements, plate elements, and other elements and which may be constrained in the appropriate manner to simulate the intended design of the structural component 250.

Step 202 of the method 200 of FIG. 2 may further include loading one or more analysis templates 28 (FIG. 3) on the server 12 (FIG. 3). For example, a static analysis template 30 (FIG. 4), a fatigue analysis template 32 (FIG. 4), and a damage tolerance analysis template 34 (FIG. 4) may be loaded onto the server 12. As indicated above, the analysis templates 28 are advantageously under the control of the source (e.g., a manufacturer) and are unalterable or unchangeable by one or more users accessing the server 12 via one or more interfaces 50. The static analysis template 30 may be selected by a user for performing a static analysis 108 (FIG. 4) of the structural component 250. The fatigue analysis template 32 and the damage tolerance analysis template 34 may be selected by a user for performing a fatigue analysis 116 (FIG. 4) of the structural component 250. As indicated above, each analysis template 28 includes the analysis methodology for analyzing a given configuration of the structural component 250. Each analysis template 28 may include a plurality of analysis variables 104 (FIG. 7) for which a user of the system 10 (FIG. 1) may assign one or more entries 106 (FIG. 7) via the interface 50 for performing a strength analysis on the structural component 250 as described in greater detail below.

Step 204 of the method 200 of FIG. 2 may include providing at least one entry 106 (FIG. 3) for one or more of the analysis variables 104 (FIG. 7) using an interface 50 such as the representative interfaces 50 shown in FIGS. 7-17. Each entry 106 may comprise an analysis input 102 (FIG. 3) for entry into the analyzer 100 (FIG. 3) for performing a strength analysis of the structural component 250 (FIG. 7). In a non-limiting embodiment, the interface 50 may be configured to provide for entry of a geometry parameter 312 (FIG. 3) of the structural component 250, a joint configuration 324 (FIG. 3) for attaching the structural component 250 to a structural assembly 252, the selection of one of the load cases 18 (FIG. 3), and/or the selection of one or more materials 24 (FIG. 3) and corresponding material allowables 26 (FIG. 3) for the structural component 250. The step of providing an entry 106 for the analysis variable 104 may comprise a user selecting an item from a pull-down menu of choices on the interface 50 or by a user manually-entering a value for the entry 106 into an entry field (not shown) that may be provided with the interface 50.

Referring to FIG. 7, shown is an embodiment of a configuration selection 52 window of the interface 50 wherein a user of the system 10 may select a configuration of the structural component 250 for strength analysis. Selection of the configuration of the structural component 250 may trigger the loading of a corresponding analysis template 28 (FIG. 3), a corresponding set of load cases 18 (FIG. 3), and material allowables 26 (FIG. 3) (i.e., material options) for the structural component 250. As can be seen in FIG. 7, the interface 50 may also present the user with the ability to select a model of the structural assembly 252 for which a strength analysis is desired. For example, the interface 50 may provide the user with the ability to select a model or configuration of an aircraft from a pull-down menu of different models or configurations of the aircraft 500 such that the correct or appropriate configuration of the structural component 250 may be analyzed. As shown in FIG. 7, the interface 50 may also provide a graphic illustration of the structural assembly 252 and which may contain one or more of the structural components 250 to be analyzed. As was indicated earlier, the structural assembly 252 may comprise a portion of an aircraft such as the aircraft 500 illustrated in FIG. 6.

Figure 6:
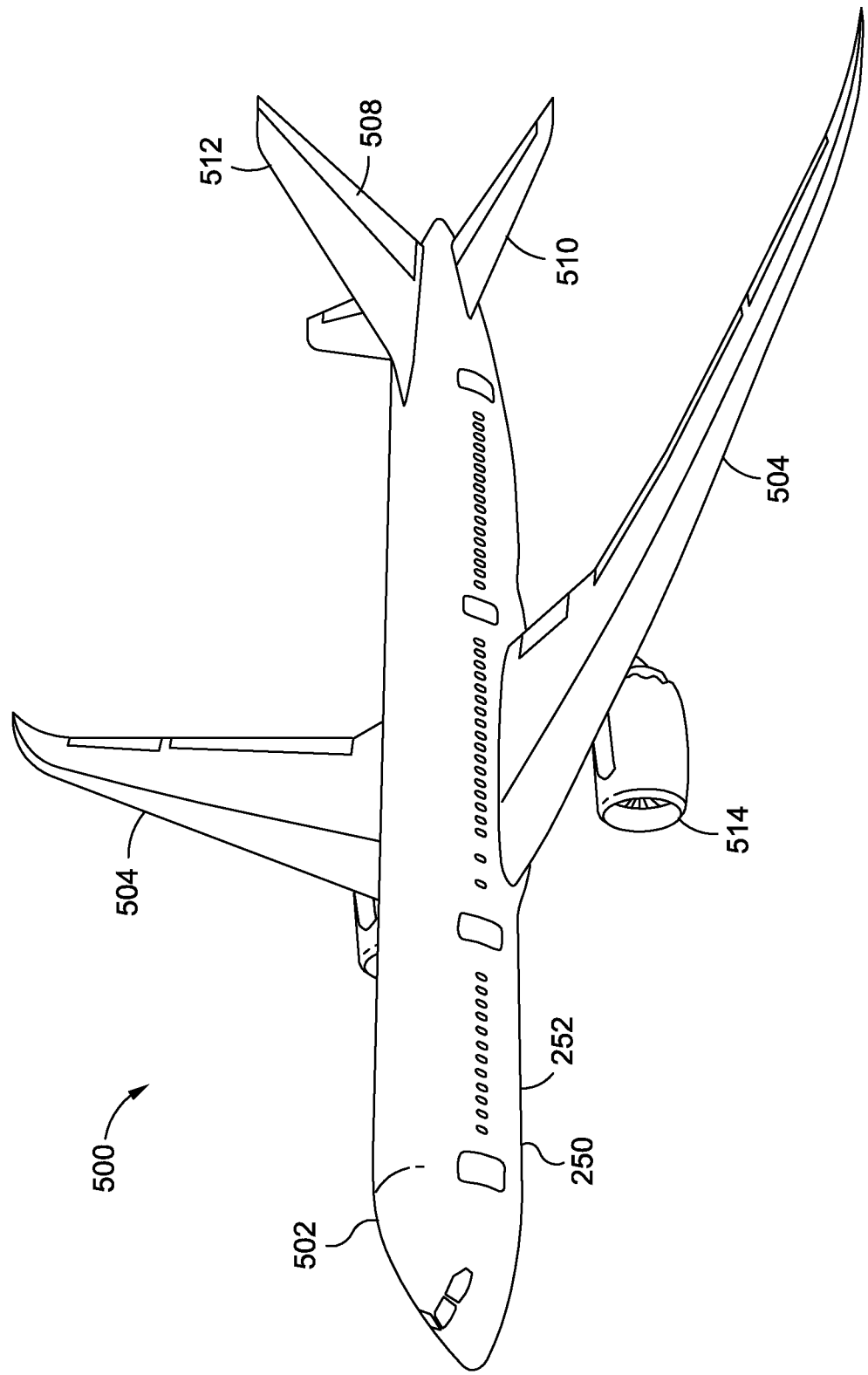
FIG. 6 is a perspective illustration of an aircraft that may include one or more structural components which may be analyzed using the system and methods disclosed herein.

As shown in FIG. 7, the interface 50 may provide the user with the ability to select a given structural component 250 for analysis. For example, in the case of an aircraft as shown in FIG. 6, a plurality of analysis templates 28 (FIG. 3), load cases 18 (FIG. 3), and material allowables 26 (FIG. 3) may be loaded onto the server 12 (FIG. 3) to represent the different structural assemblies of the aircraft 500 which may include, for example, the different barrel sections (not shown) of the fuselage 502, the horizontal stabilizer 510 and vertical stabilizer 512 of the empennage 508, the wing 504, the propulsion units 514, and other structure. The interface 50 (FIG. 7) may be configured to allow a user to select from among the different structural assemblies or structural components 250 of the aircraft 500 that may be loaded onto the server 12 for analysis. The structural assembly 252 shown in FIG. 7 may comprise an assembly for a nose wheel well of an aircraft 500 (FIG. 6). In the embodiment shown, the structural assembly 252 may include a pair of bulkheads 254 and a plurality of vertically oriented and horizontally-oriented beams 258 which may be fastened to a panel 256 of the nose wheel well. The system 10 and method of the present disclosure is described in the context of the analysis and optimization of one of the vertically-oriented beams 258 (FIG. 8) of the nose wheel well.

Figure 8:
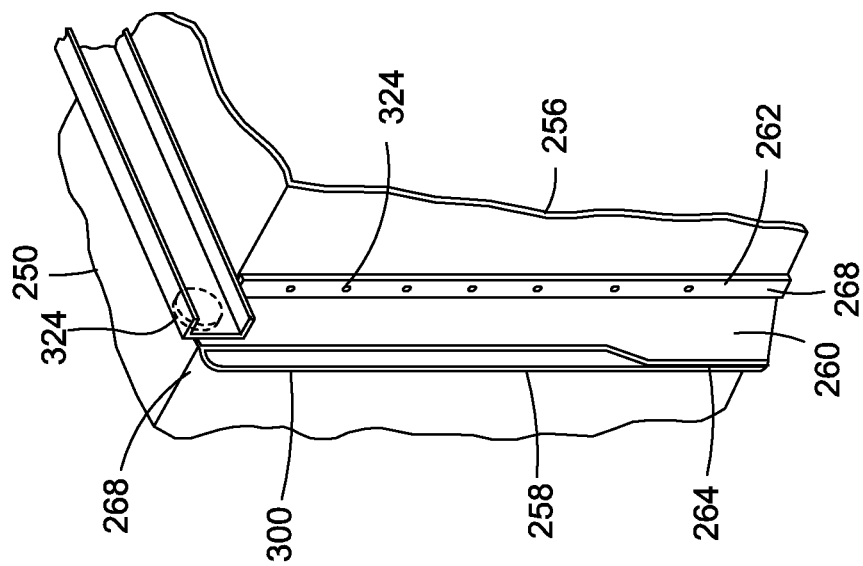
FIG. 8 is a perspective illustration of an embodiment of a structural assembly and illustrating a structural component mounted to a panel of the structural assembly.

Referring to FIG. 8, shown is a portion of the structural assembly 252 of FIG. 7 and illustrating one of the vertically-oriented beams 258 for strength analysis using the system 10 (FIG. 7) and method disclosed herein. The beam 258 is illustrated as having an I-beam cross-sectional shape including a free flange 264 connected to an attach flange 262 by a web 260. The beam 258 may be mounted to the panel 256 by means of a plurality of mechanical fasteners (not shown) for attaching the attach flange 262 to the panel 256. One or more ends of the selected beam 258 may also be coupled to one of the horizontally-oriented beams by means of a plurality of fasteners. In the present disclosure, the system 10 advantageously provides the user with the ability to enter data into a variety of analysis variables 104 of an analysis template 28 to define the geometry parameters 312 of a structural component 250 such as the beam 258 and to define the joint configuration 324 for attaching the structural component 250 to the structural assembly 252. For example, the interface 50 provides the user with a means to define the geometry parameters 312 of the beam 258 and for defining the joint configuration 324 for attaching the beam 258 to the panel 256. In addition, the interface 50 (FIG. 7) provides the user with the ability to define the beam 258 geometry by location 268 such as by station location, waterline location, or butt line location (not shown), or by other location-identifying means.

Figure 9:
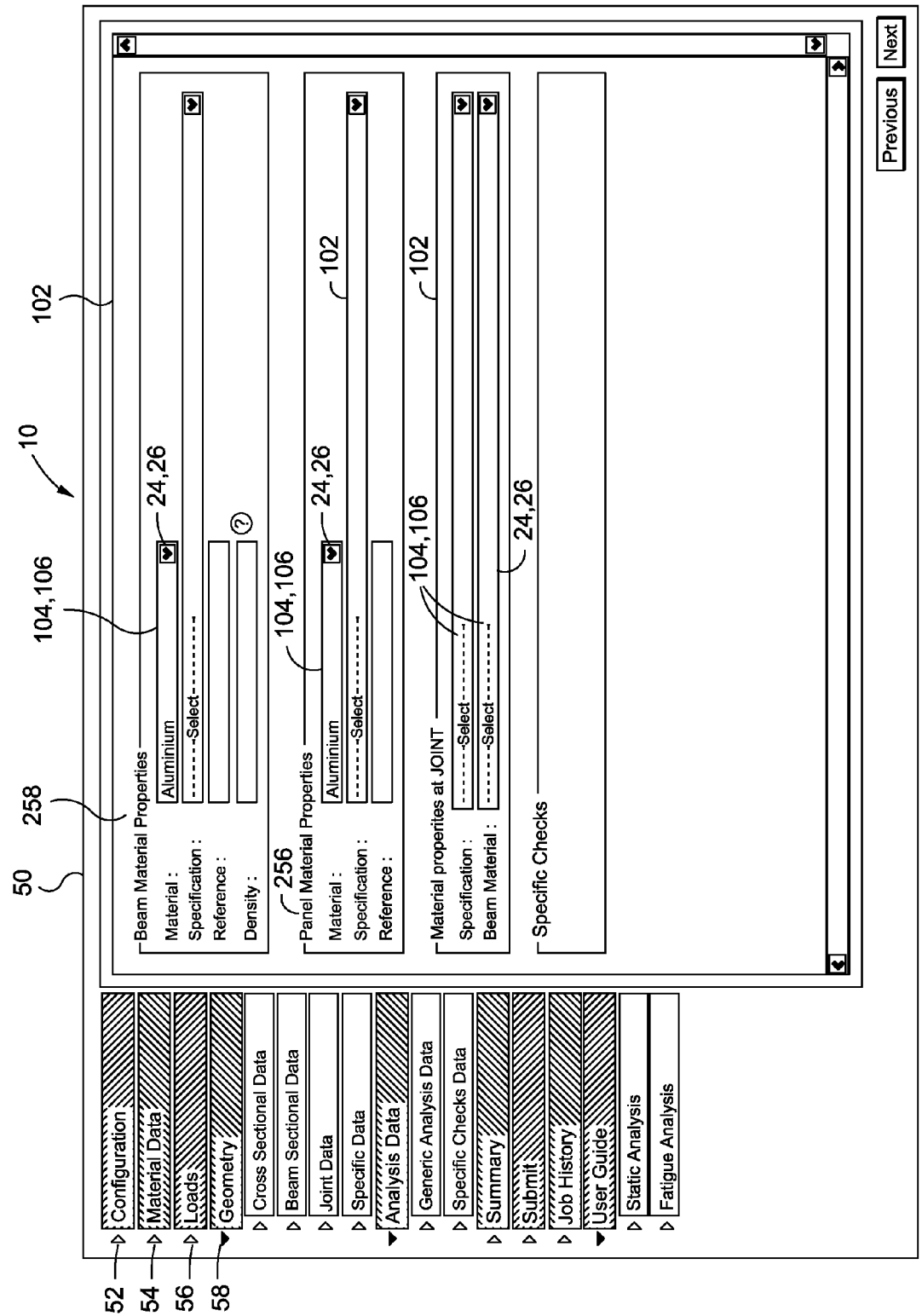
FIG. 9 is an illustration of an embodiment of the interface for selecting at least one material as an entry for the analysis variable for performing the analysis of the structural component.

Referring to FIG. 9, shown is an embodiment of a material selection 54 window of the interface 50 for selecting a material 24 (FIG. 3) as an entry 106 (FIG. 3) for the analysis variable 104 (FIG. 3). As was indicated earlier, a listing of materials 24 and corresponding material allowables 26 may be preloaded onto the server 12 (FIG. 3). A user may select one of the preloaded materials 24 (e.g., aluminum, titanium)

from a pull-down menu. Selection of one of the materials may result in entry 106 of the corresponding material allowable 26 into the analysis template 28 (FIG. 3). The interface 50 may include an option for selecting a specification of a material 24 such that a user may select a desired alloy and/or a desired heat treat of the material. For example, in the case of aluminum, a user may select from a pull-down menu listing 7075-T7351 aluminum and 7075-T651 aluminum. The interface 50 may provide the user with the option of selecting one or more materials for the beam 258 and the option of selecting the same or different materials for the panel 256 (FIG. 8) or other structure to which the beam 258 may be attached.

The system 10 and method disclosed herein may be configured to facilitate manual entry by a user of one or more values for any of the analysis variables 104 or other aspect of the structural component 250, without limitation, and is not limited to selection of values from a predefined set of choices such as in a pull-down menu. For example, the system 10 may be configured to facilitate entry by a user of one or more analysis input 102 values for a material allowable 26 of the structural component 250, a geometry of the structural component 250 (e.g., height, thickness, configuration), or any other aspect of the structural component 250. The system 10 may additionally include a screening capability wherein manual entries from a user may be screened to determine if such entries conform to the intent of a program design guide or conform to the intent of program requirements. In the event that an entry by a user fails to conform to a design guide or a program requirement, the system 10 may be configured to restrict or prevent the analysis and/or optimization of the structural component 250. For example, a design guide may restrict the use of certain materials for certain applications (e.g., locations) of a given structural component 250 in relation to an operating environment or structural environment of the structural component 250. Entry of a given material into the system 10 by a user may result in the system 10 preventing analysis and/or optimization of the structural component 250 and may include the display of an error message (not shown) on the interface 50 indicating that the selected material is unauthorized for use in the given application.

Referring to FIG. 9, the interface 50 may additionally provide the user with the option of entering a desired mass density (not shown) for performing the strength analysis. As may be appreciated, the interface 50 may include any number of additional material selection 54 options and is not limited to selection of the material type (e.g., aluminum, titanium), material specification (e.g., heat treat specification), and mass density. Further in this regard, the interface 50 is not limited to selection of metallic materials but may provide a user with the ability to select composite materials and corresponding material allowables 26. Additionally, it is contemplated that the interface 50 may be configured to allow a user to select a composite material system (e.g., fiber-reinforced polymer composite material) for analyzing a structural component 250 (FIG. 7). For example, the interface 50 may be configured to provide the user with the ability to select a ply stackup (not shown) of a composite laminate (not shown) for use in a structural component 250. The interface 50 may provide the user with the ability to select various parameters of the composite laminate such as ply orientation, ply quantity, individual ply thickness, the composition of the ply material and the matrix material, fiber volume fraction, and any one of a variety of additional parameters. In this regard, the system 10 and method disclosed herein is not limited to analysis and optimization of metallic structural components 250 but may include analysis and optimization of structural components 250 fabricated, in whole or in part, from composite materials such as fiber-reinforced polymer composite material.

Figure 10:
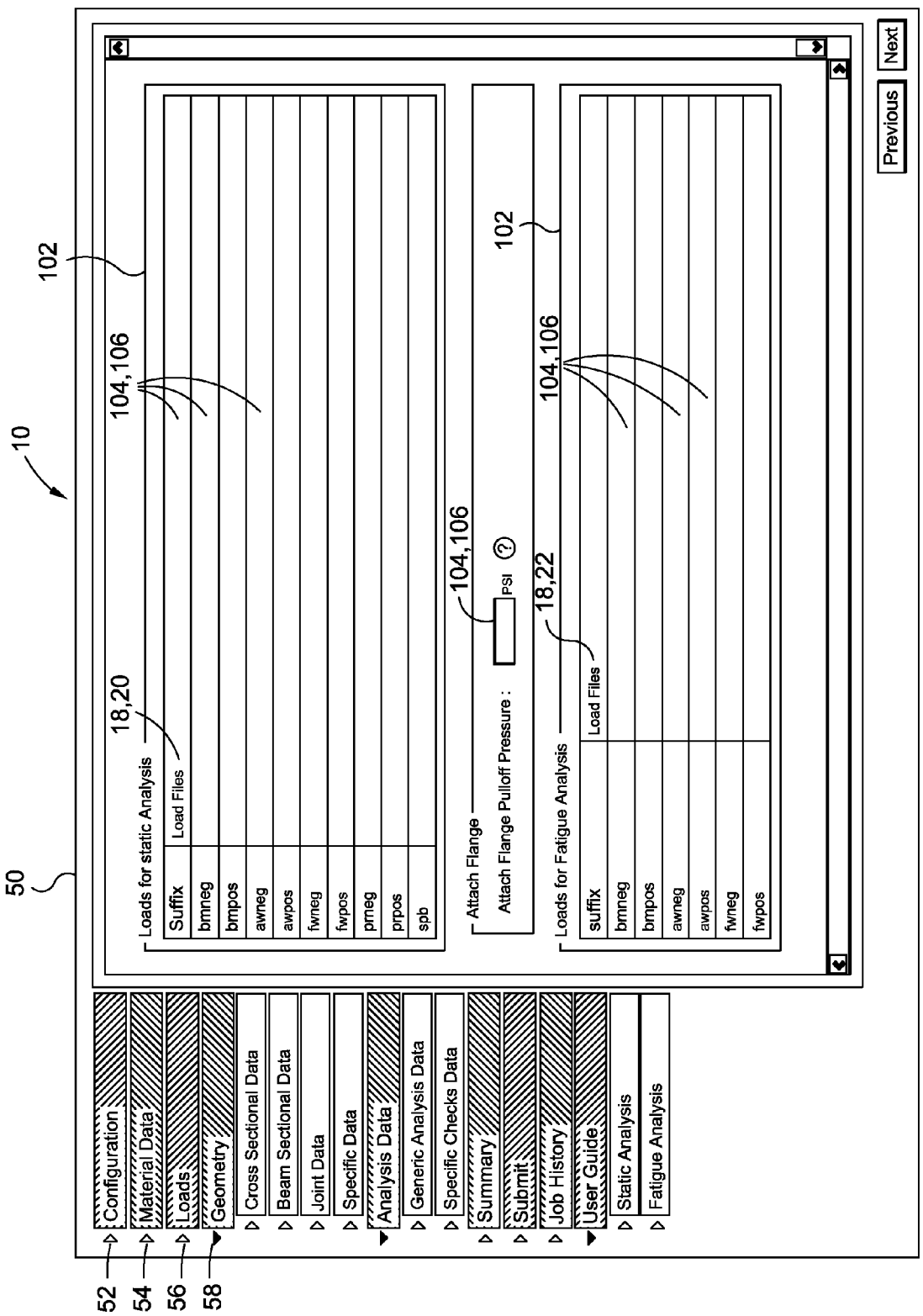
FIG. 10 is an illustration of an embodiment of the interface for selecting at least one load case as an entry for the analysis variable.

Referring to FIG. 10, shown is an embodiment of a load case selection 56 window of the interface 50 for selecting one or more load cases 18 as an entry 106 for one or more of the analysis variables 104 for static analysis 108 (FIG. 4) and/or fatigue analysis 116 (FIG. 4) of a structural component 250 (FIG. 7). As was indicated earlier, a set of load cases 18 may be loaded onto the server 12 (FIG. 3) and may include static load cases 20 and fatigue load cases 22. A user may select one of the load cases 18 for analysis by the structural component analyzer 100 such as from a pull down menu. Alternatively, it is contemplated that the interface 50 may provide the user with the option of manually-entering the magnitude, direction, and location of the listening loads to be applied to the structural component 250 during analysis.

Figure 11:
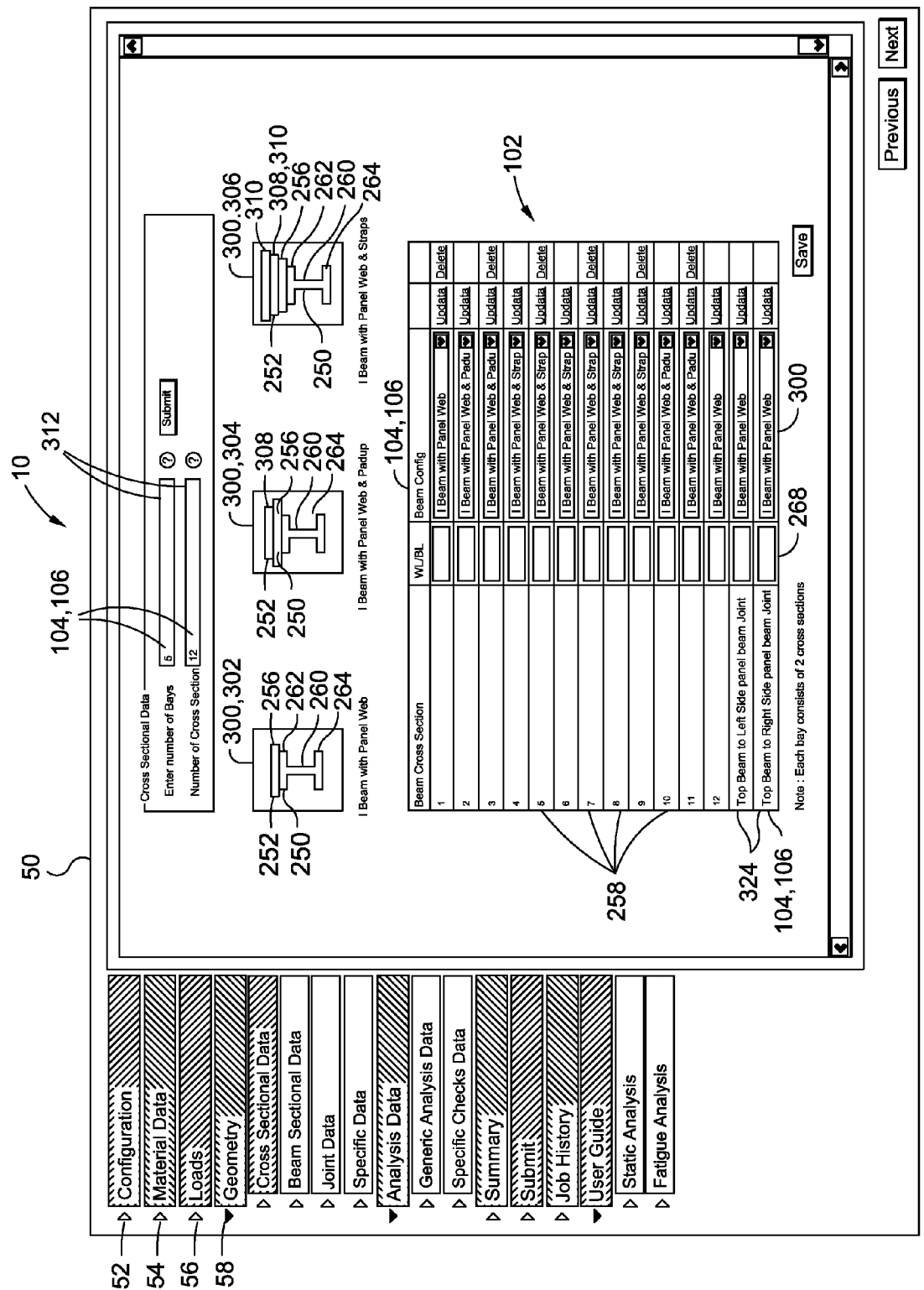
FIG. 11 is an illustration of an embodiment of the interface for selecting a configuration of the structural component as an entry for the analysis variable.

Referring to FIG. 11, shown is an embodiment of a geometry selection 58 window of the interface 50 for selecting a geometry parameter 312 of the structural component 250 (FIG. 7) as an entry 106 for one of the analysis variables 104 of one of the analysis templates 28 (FIG. 3). In the embodiment shown, the geometry parameter 312 may comprise a configuration 300 of the structural component 250. For example, in FIG. 11, a user may select from a first beam configuration 302, a second beam configuration 304, and a third beam configuration 306 to define the cross-sectional configuration 300 of the beam 258. The first beam configuration 302 may comprise the beam 258 being mounted directly to the panel 256. The second beam configuration 304 may comprise the beam 258 being mounted to the panel 256 with a padup 308 of reinforcing material located on a side of the panel 256 opposite the beam 258. The third beam configuration 306 may comprise the beam 258 and a plurality of straps 310 mounted to the panel 256. The interface 50 may provide the user with the option of selecting additional configuration 300 options for the beam 258. For example, the interface 50 may provide the user with the option of selecting the quantity of cross sections of the beam 258 to be analyzed and may include the ability to assign one of the first, second, and third beam configurations 302, 304, 306 to each location.

Figure 12:
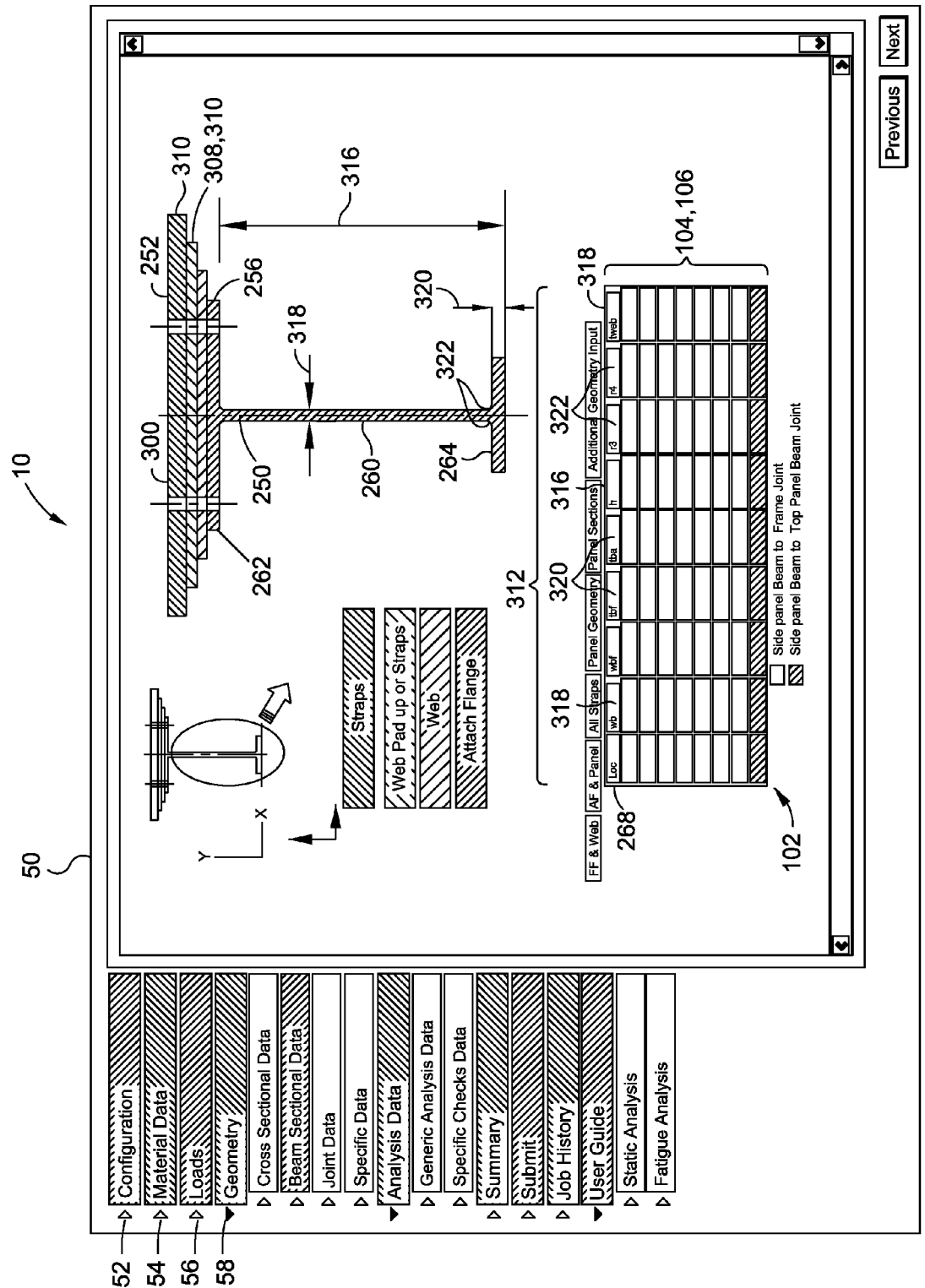
FIG. 12 is an illustration of an embodiment of the interface for selecting a geometry parameter of the structural component as an entry for the analysis variable.

Referring to FIG. 12, shown is an embodiment of a geometry selection 58 window of the interface 50 for selecting initial dimensions 314 (FIG. 5) to be assigned to the different portions of the structural component 250. In the embodiment shown, the interface 50 may provide the user with the option of selecting a gauge or a thickness 318 of the web 260, a thickness 320 of the attach flange 262, and a thickness 320 of the free flange 264 of the beam 258 (FIG. 9). In addition, the interface 50 may provide the user with the option of selecting a height 316 of the beam 258, a size of the filet radii 322 at the intersection between the flanges 262, 264 and the web 260, and any one of a variety of other dimensions that may be associated with the beam 258. For example, it is contemplated that the geometry selection 58 window of the interface 50 may provide the user with the option of selecting a length or a width of the beam 258, or other geometry such as tapers, holes, or other features that may be associated with the beam 258. The interface 50 may additionally provide the ability to specify the geometry of the structural assembly 252 to which the structural components 250 may be attached. For example, the interface 50 may provide the user with the option of selecting dimensions associated with the panel 256 thickness and the general configuration of the panel 256 such as stiffeners (not shown) that may be integrally formed with the panel 256. As may be appreciated, depending on the configuration of the structural component 250 to be analyzed, any number of different geometric features may be specified by a user using the interface 50.

Figure 13:
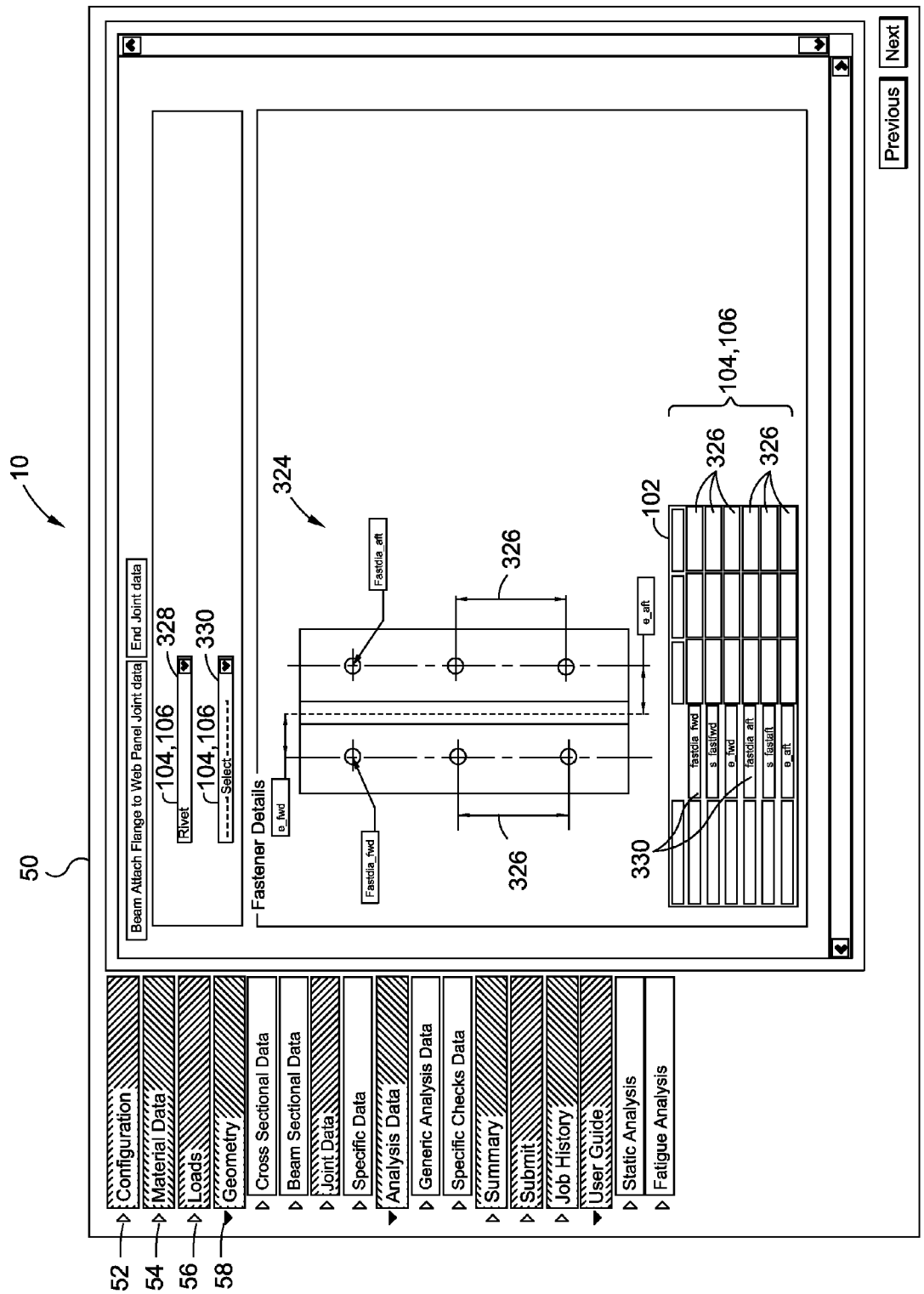
FIG. 13 is a representative display of the interface for selecting a joint configuration of the structural component as an entry for the analysis variable.

Referring to FIG. 13, shown is an embodiment of a joint configuration 324 selection 52 window of the interface 50 for specifying the attachment of the structural component 250 to the structural assembly 252 as one of the entries 106 (FIG. 3) for the analysis variables 104 (FIG. 3). In the embodiment shown, the interface 50 may provide the user with the option of selecting the arrangement of mechanical fasteners (not shown) for attaching the structural component 250 to the structural assembly 252. For example, the interface 50 may provide the user with the option of selecting the fastener type 328 (e.g., rivet, bolt, Hi-lok™) and the fastener specification 330 (e.g., diameter, material, head configuration). In addition, the interface 50 may provide the user with the option of selecting the fastener spacing 326, the edge distance, and other fastener parameters. Although not shown, it is also contemplated that the interface 50 may be configured to allow a user to select an adhesive for bonding the structural component 250 to the structural assembly 252. Such an arrangement may be provided for in a structural component 250 formed of composite material and/or metallic material.

Figure 4:
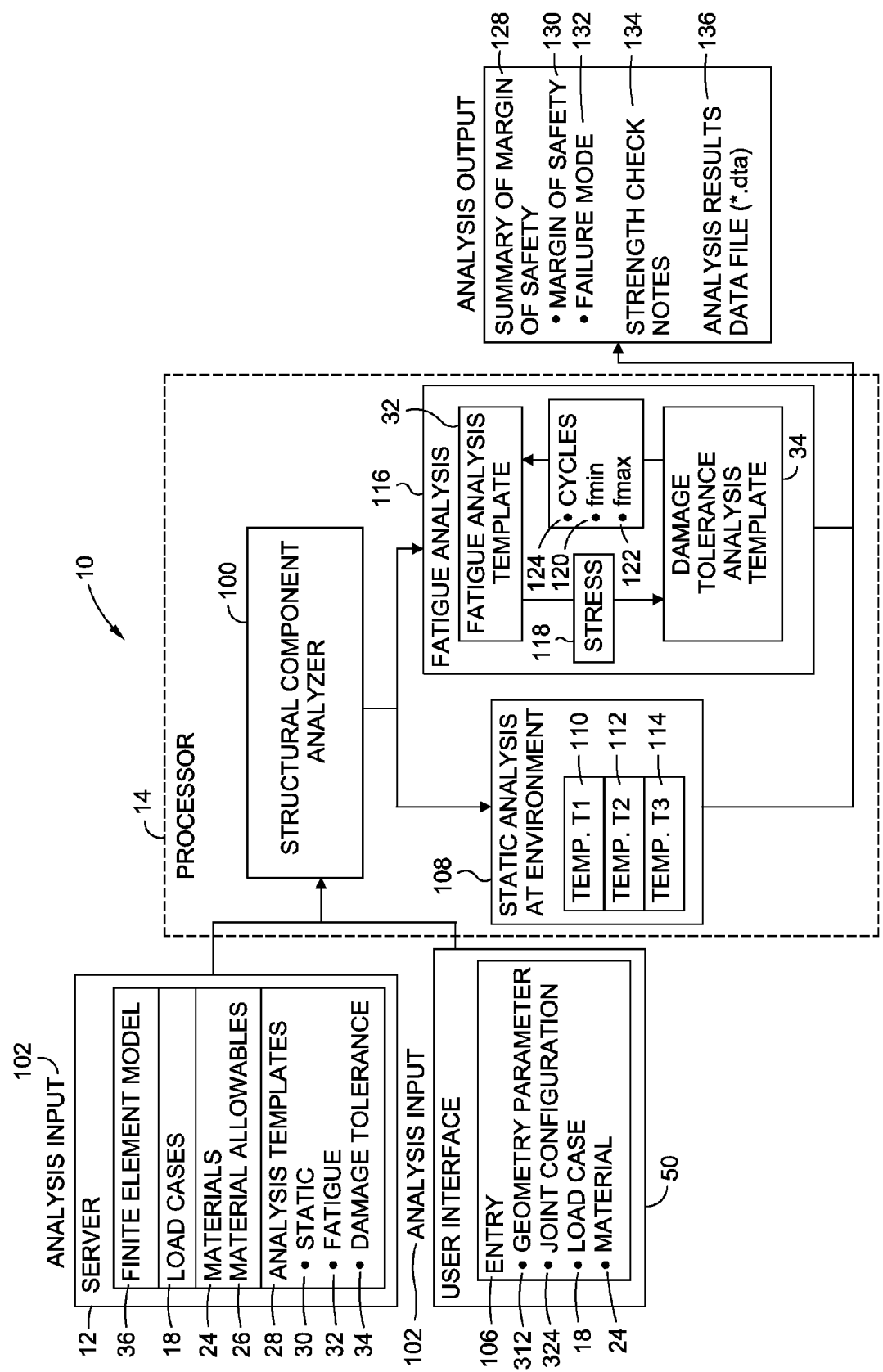
FIG. 4 is a block diagram of the structural component analyzer in an embodiment for performing a static analysis and a fatigue analysis of the structural component.

In FIG. 2, step 206 of the method 200 may include performing a strength analysis of the structural component 250 (FIG. 7) using one or more of the analysis templates 28 (FIG. 4). The above-described entries 106 (FIG. 4) for the analysis variables 104 (FIG. 4) may be submitted to the structural component analyzer 100 shown in FIG. 4. Upon receiving the entries 106, the analyzer 100 may perform a static analysis 108 (FIG. 4) of the structural component 250 using the static analysis template 30 (FIG. 4) and a selected static load case 20 (FIG. 4). Likewise, the analyzer 100 may perform a fatigue analysis 116 (FIG. 4) of the structural component 250 based on the selected fatigue load case 22 (FIG. 4) and using the fatigue analysis template 32 (FIG. 4) and the damage tolerance analysis template 34 (FIG. 4).

FIG. 4 illustrates a block diagram of a processor 14 for performing a static analysis 108 and/or a fatigue analysis 116 of the structural component 250 using the structural component analyzer 100. Because the material allowables 26 (e.g., strength, stiffness) of a given material may vary with temperature, the analyzer 100 may perform a static analysis 108 of the structural component 250 at the different environments to which the structural component 250 may be subjected during service. For example, the environment may include two or more different temperatures that may be representative of the temperatures to which the structural component 250 may be subjected during service. The analyzer 100 may perform a static analysis 108 of the structural component 250 at a first temperature 110, at a second temperature 112, and a third temperature 114. In the example of an aircraft 500 (FIG. 6), the first temperature 110 may comprise a room temperature (e.g., 70° F.). The second temperature 112 may comprise a maximum operating temperature of the structural component 250 such as when the aircraft 500 is parked on an airport tarmac during summertime at a location where the temperature may reach 120° F. or more. The third temperature 114 may comprise a minimum operating temperature of the structural component 250 such as when the aircraft 500 is at a cruising altitude of 35,000 feet where the temperature may reach −65° F. or less.

In FIG. 4, the analyzer 100 may perform a fatigue analysis 116 using the fatigue analysis template 32 and the damage tolerance analysis template 34. The fatigue analysis 116 may be based upon fatigue loads using a design service objective of the structural component 250 (FIG. 7) comprising a predetermined quantity of fatigue cycles 124. For an aircraft, the fatigue cycles 124 may comprise a predetermined quantity of ground-air-ground cycles 124 (e.g., 44,000) for the structural component 250. In an embodiment, the interface 50 may be configured to provide the user with the option of adjusting the quantity of fatigue cycles 124 and other parameters that may be associated with the fatigue analysis 116. Based on the selected load case 18, the fatigue analysis template 32 may generate a stress 118 level for submitting to the damage tolerance analysis template 34 for calculating a minimum stress 120 ($f_{min}$) and a maximum stress 122 ($f_{max}$) associated with each cycle.

In FIG. 2, step 208 of the method 200 may include determining a margin of safety 130 (FIG. 4) of the structural component 250 (FIG. 7) based on the material allowables 26 (FIG. 4). In this regard, the analyzer 100 may generate an analysis output 126 (FIG. 4) comprising at least one margin of safety 130 of the structural component 250 based on the static analysis 108 (FIG. 4) and/or the fatigue analysis 116 (FIG. 4) and based on the material allowables 26 of the structural component 250. The system 10 may be configured to generate a report that may include a summary 128 (FIG. 4) of the margins of safety 130 of the structural component 250 based on the static analysis 108 and/or the fatigue analysis 116. The system 10 may further generate at least one analysis results data file 136 (FIG. 4) associated with the summary 128 of the margin of safety 130.

Figures 14, 15:
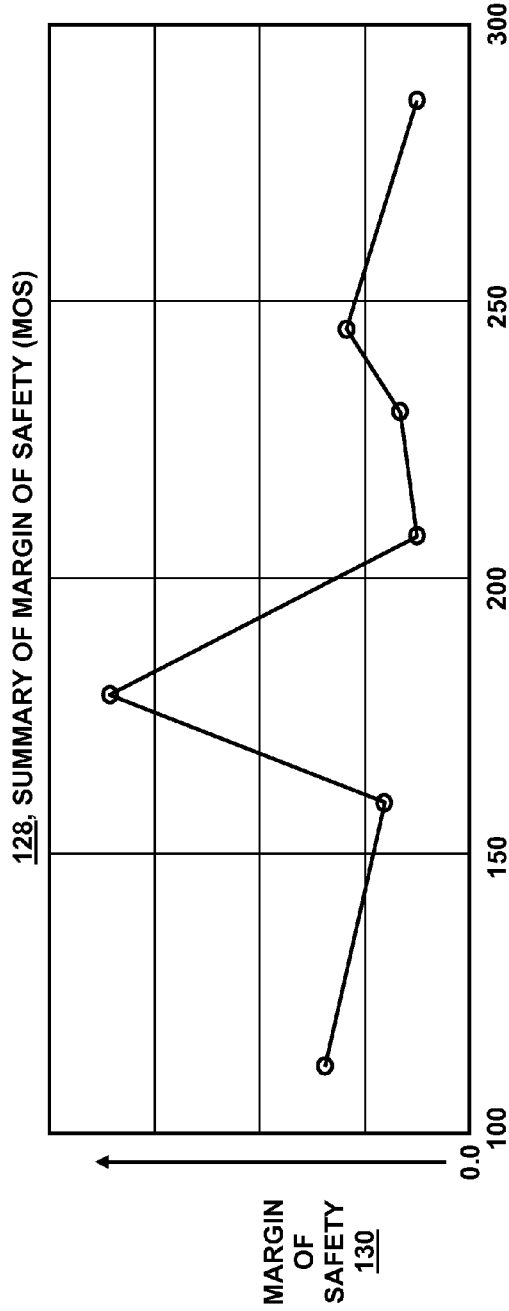
FIG. 14 is an illustration of graph plotting a summary of margins of safety of the structural component as a function of location.
FIG. 15 is an illustration of a table listing the margins of safety of the structural component by location and a failure mode corresponding to each margin of safety.

Referring briefly to FIGS. 14-15, shown in FIG. 14 is an embodiment of a report of the analysis output 126 which may comprise strength check notes 134 including a graph plotting the minimum margins of safety 130 of the structural component 250 (FIG. 7) by location. FIG. 15 is a textual representation of the analysis output 126 and including a tabular listing of the margins of safety 130 of the structural component 250 for each location and the related environment such as the temperature at which the structural component 250 was analyzed (e.g., 70° F.). The tabular listing may further include an identification of the failure mode 132 (e.g., bearing critical, shear critical, etc.) corresponding to each margin of safety 130 listed for the structural component 250. Although not shown, the strength check notes 134 may further include a listing of critical loads acting on the structural component 250, an indication of displacements of the structural component 250, an indication of the stress distribution in the structural component 250, and a variety of additional information.

Figure 5:
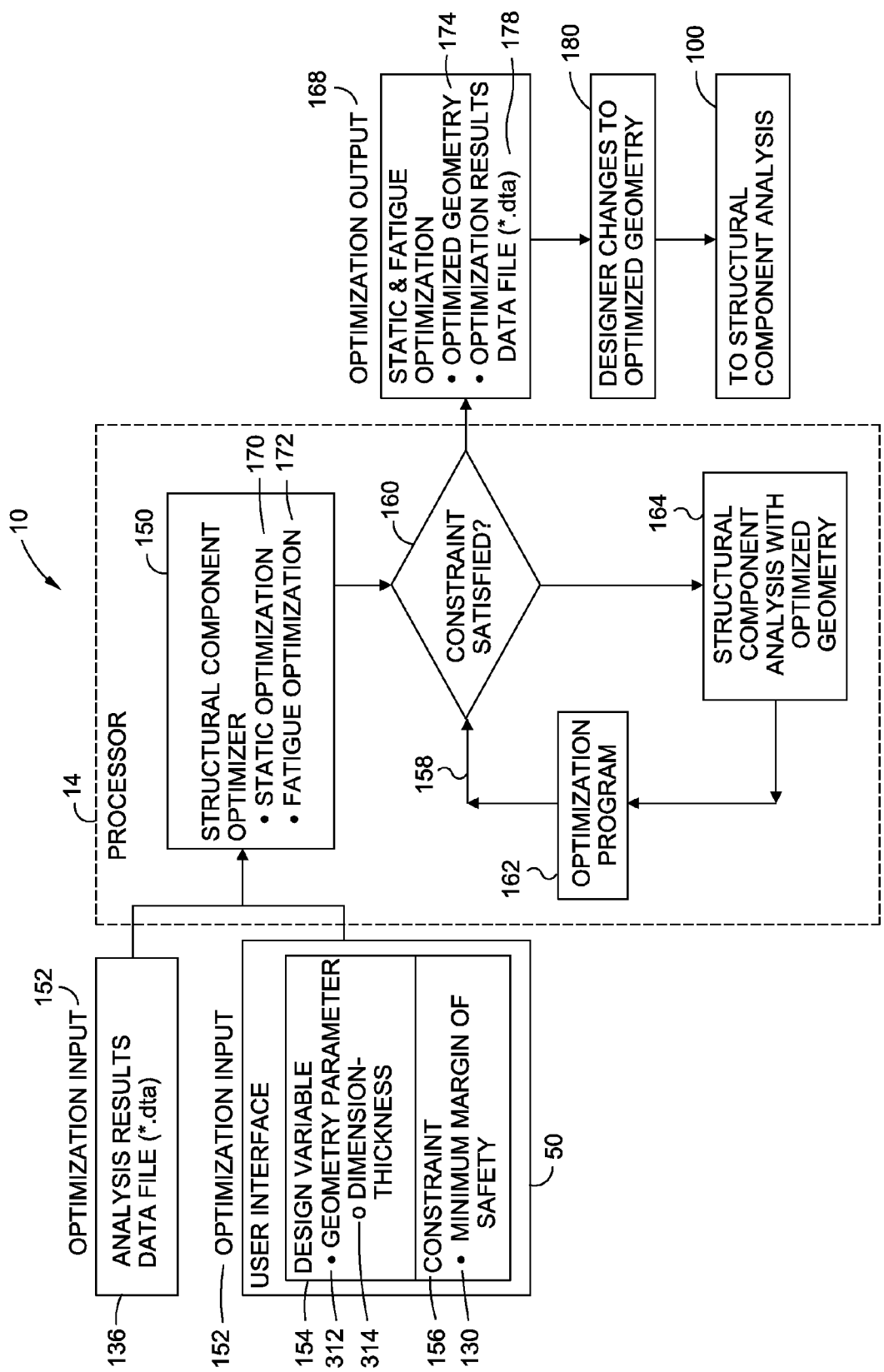
FIG. 5 is a block diagram of the structural component optimizer including an optimization loop for determining an optimized geometry of the structural component.

In FIG. 2, step 210 of the method 200 may include selecting at least one design variable 154 (FIG. 5) of the structural component 250 (FIG. 7) for optimization thereof. The design variable 154 may be entered by a user using the interface 50 (FIG. 5). The design variable 154 may be used by the structural component optimizer 150 for performing the optimization of the structural component 250. Shown in FIG. 5 is a block diagram of the processor 14 for performing the optimization using the optimizer 150. As indicated above, the optimizer 150 may be configured to optimize a geometry of the structural component 250 based on a predetermined objective such as minimizing weight of the structural component 250. However, it is contemplated that the optimizer 150 may be configured to optimize the structural component 250 for other objectives such as for a desired level of stiffness, a maximum amount of deflection of the structural component 250, or for any one of a variety of other objectives. The optimizer 150 may receive data from the analysis results data file 136 for performing the optimization.

Figure 16:
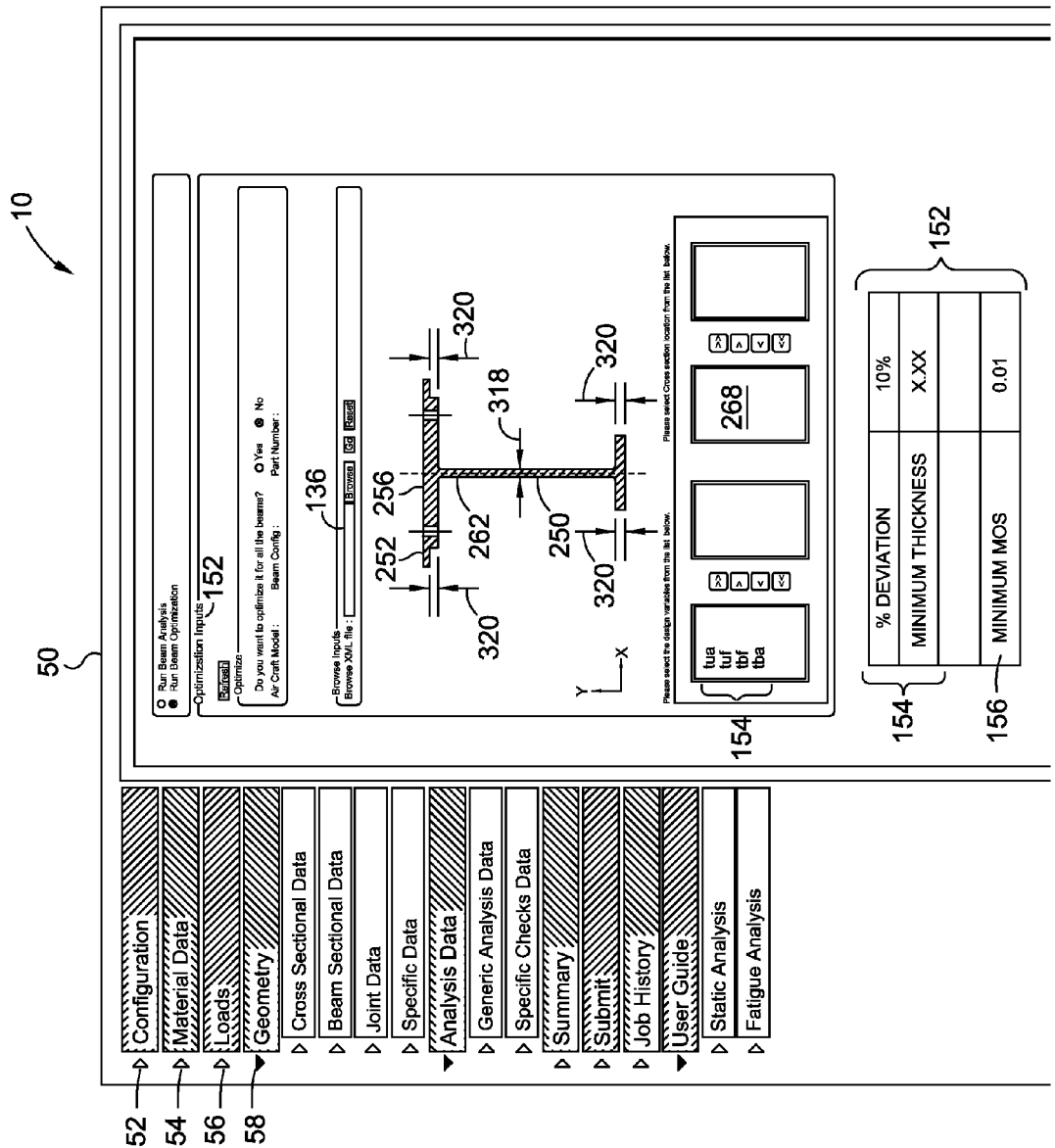
FIG. 16 is an illustration of an embodiment of the interface for selecting a design variable and a constraint for performing the optimization of the structural component.

Referring briefly to FIG. 16, shown is an embodiment of an optimization input 152 window for submitting a design variable 154 according to step 210 FIG. 2. The design variable 154 may comprise a geometry parameter 312 (FIG. 12) such as a dimension 314 of the structural component 250. For example, the design variable 154 may comprise a web thickness 318 of the beam 258 illustrated in FIG. 8 having an initial dimension 314 (e.g., 0.150 inch). However, the design variable 154 may comprise any parameter, without limitation, for which optimization of the structural component 250 is desired. For example, the design variable 154 may comprise a thickness, a length, a width, or any other dimension associated with the structural component 250 (FIG. 7) or with the structural assembly 252 (FIG. 7) to which the component may be attached. In an embodiment, the design variable 154 may optionally comprise a parameter of the joint configuration 324 (FIG. 13) such as a fastener spacing 326 (FIG. 13), a fastener diameter, a fastener material, or any one of a variety of other parameters associated with the structural component 250. In an embodiment, the interface 50 may provide the user with the capability of selecting a specific location of the structural component 250 where optimization is desired.

In FIG. 2, step 212 of the method 200 may include entering at least one constraint 156 (FIG. 5) for optimization of the structural component 250 (FIG. 7). The constraint 156 may comprise a strength constraint such as a minimum margin of safety 130 (FIG. 5) of the structural component 250 that must be satisfied during the optimization of the design variable 154. The constraint 156 may include alternative parameters such as a manufacturing constraint. For example, in an embodiment, the constraint 156 may comprise a minimum thickness of a portion of the structural assembly 252. With regard to the beam 258 illustrated in FIG. 7, the constraint 156 may comprise a minimum thickness (e.g., 0.080 inch) of the web 260 to maintain the web at a machinable thickness. However, the constraint 156 may include any one of a variety of other parameters and is not limited to those mentioned above.

In FIG. 2, step 214 of the method 200 may include performing an optimization of the structural component 250 (FIG. 7) by iteratively updating the design variable 154 (FIG. 5) until the constraint 156 (FIG. 5) is substantially satisfied. As shown in FIG. 5, the optimizer 150 may include an optimization loop 158 for performing a static optimization 170 or a fatigue optimization 172 based on the analysis results data file 136 of the strength analysis of the structural component 250. The optimization loop 158 may include a decision block regarding whether the constraint 156 is substantially satisfied 160. The optimizer 150 may be configured to iteratively update the design variable 154 (e.g., the web thickness 318) by analysis 164 of the structural component 250 with an optimized geometry 174 using a suitable optimization program 162 such as Hyperstudy™ commercially available from Altair Corporation of Irvine, Calif. The optimization loop 158 may be configured to generate a temporary analysis data results file during each iteration of the design variable 154.

In FIG. 2, step 216 of the method 200 may include determining an optimized geometry 174 (FIG. 5) of the structural component 250 (FIG. 7) based on the optimization of the design variable 154 (FIG. 5). In FIG. 5, when the constraint 156 is substantially satisfied 160, the optimization loop 158 may output an optimization results data file 178 containing the optimized geometry 174 of the structural component 250. The optimizer 150 may generate an optimization output 168 for the static optimization 170 and fatigue optimization 172 of the structural component 250. The optimization output 168 may include a report that may indicate the initial value of the design variable 154 and the optimized geometry 174 (FIG. 5) (e.g., a thickness dimension) of the design variable 154 and may further include a listing of critical margins of safety 130 and the associated failure modes 132 by location of the structural component 250.

In FIG. 5, the optimized geometry 174 may be reviewed by a stress analyst, a design engineer, or other personnel for approval 180 and prior to updating a detailed computer aided design model (CAD) model 38 (FIG. 3) of the structural component 250 (FIG. 7). The detailed CAD model 38 of the structural component 250 may be owned or developed by the user and may be associated with the interface 50 for updating the geometry of the structural component 250. Upon generating an optimized geometry 174, the system 10 may perform an additional strength analysis of the structural component 250 and may generate one or more additional sets of analysis output 126 (FIG. 3) and/or optimization output 168 (FIG. 3) including a summary 128 (FIG. 3) of the margins of safety 130 (FIG. 3).

In a further embodiment, the system 10 (FIG. 3) and method may include determining a damage tolerance limit of the structural component 250 (FIG. 7) and a corresponding margin of safety (not shown). For example, the damage tolerance limit of the structural component 250 may be determined with regard to a minimum acceptable thickness of a portion of the structural component 250 at a given location. Determination of the damage tolerance limit may include entering a dimension of the structural component 250 as an entry 106 (FIG. 4) for the analysis variable 104 (FIG. 4). The dimension may comprise an out-of-tolerance condition of the structural component 250 such as a condition wherein a thickness of a portion of the structural component 250 is below design tolerances as may occur during a manufacturing anomaly. The method 200 may include performing a strength analysis and an optimization of the structural component 250 using the analyzer 100 (FIG. 4) and the optimizer 150 (FIG. 5) in order to determine the margin of safety 130 associated with the out-of-tolerance condition of the structural component 250.

Figure 17:
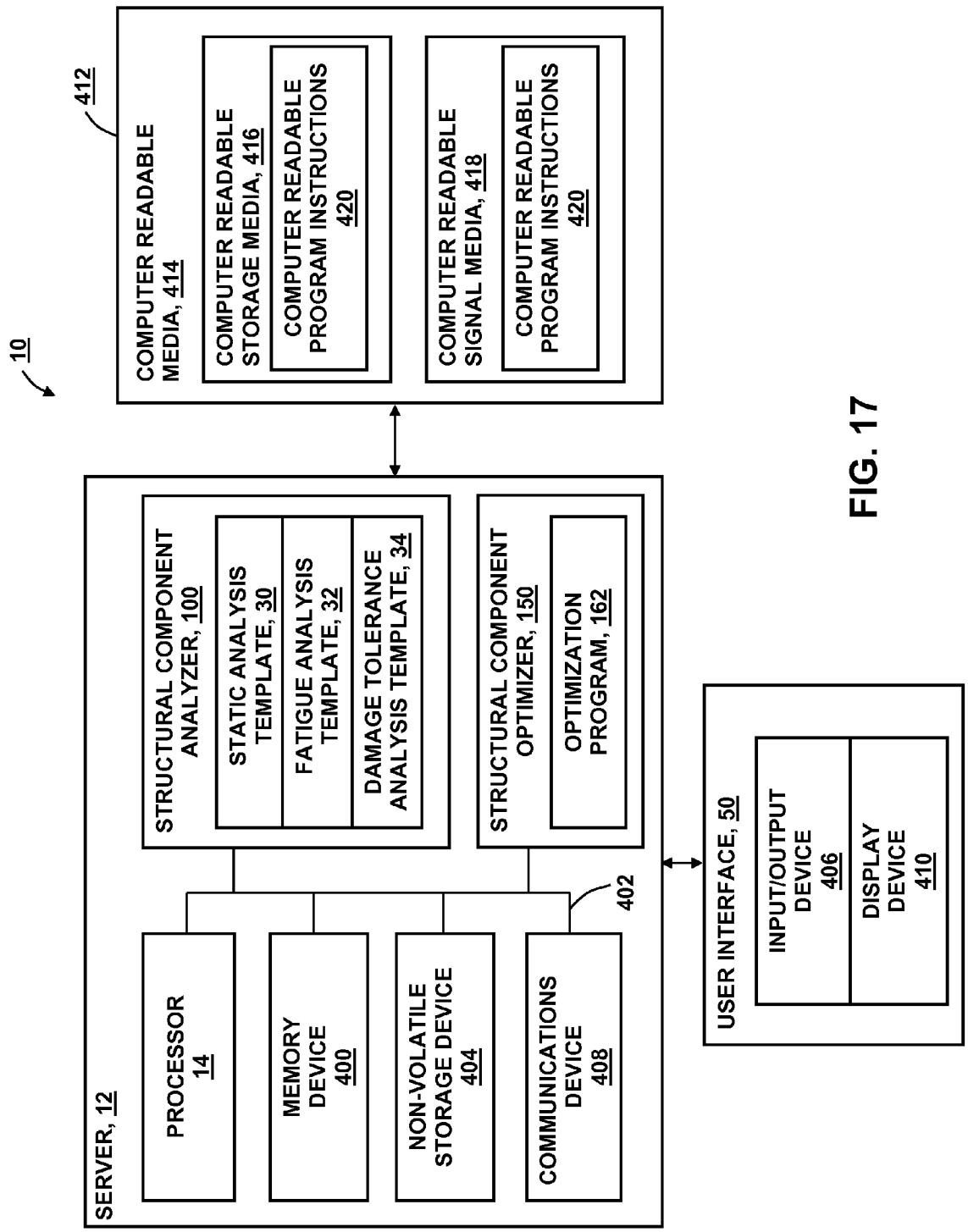
FIG. 17 is a block diagram of an embodiment of a processor-based system for implementing one or more operations of the methodology for analyzing the structural component.

Referring to FIG. 17, the above-described steps of the disclosed methodologies or any combination of the steps, in whole or in part, may be implemented in a computer-implemented process such as on a processor-based system 10 or other suitable computer system. The processor-based system 10 may perform computable readable program instructions 420. The computable readable program instructions 420 may be provided to or loaded onto the processor-based system 10 in order to implement one or more of the above-described operations or steps. In a non-limiting example, the processor-based system 10 and/or the computable readable program instructions 420 may facilitate the strength analysis and/or the optimization of a structural component 250 (FIG. 7) as described in greater detail below.

The block diagram of FIG. 17 illustrates the processor-based system 10 in an advantageous embodiment that may be used to perform a static analysis 108 (FIG. 4) and/or a fatigue analysis 116 (FIG. 4) of the structural component 250 or to perform an optimization (FIG. 5) of the structural component 250. The processor-based system 10 may include a data communication path 402 (e.g., data link) to communicatively couple one or more components to facilitate transfer of data between such components. In an embodiment, the communication path 402 may comprise one or more data buses or any other suitable communication path that facilitates the transfer of data between the components and devices of the processor-based system 10.

In a non-limiting embodiment, the components may include one or more of a processor 14, a memory device 400, a non-volatile storage device 404, a communications device 408, a user interface 50 having an input/output device 406 and a display device 410, a structural component analyzer 100, and a structural component optimizer 150. The structural component analyzer 100 (FIG. 4) may perform a strength analysis of the structural component 250. The analyzer 100 may perform a static analysis 108 (FIG. 4) of the structural component 250 and/or a fatigue analysis 116 (FIG. 4) as described above. The analyzer 100 may receive an analysis results data file 136 (FIG. 4) from the server 12.

The analyzer 100 (FIG. 4) may receive entries 106 (FIG. 4) for the analysis variables 104 (FIG. 4) from the interface 50 (FIG. 4) via the input/output device 406 (FIG. 17). Non-limiting examples of entries 106 for the analysis variables 104 include materials 24 (FIG. 4) selection, the selection of a load case 18 (FIG. 4) for performing the strength analysis, entry of one or more geometry parameters 312 (FIG. 4) of the structural component 250, and selection of a joint configuration 324 (FIG. 4) of the structural component 250. The analyzer 100 may perform a static analysis 108 (FIG. 4) using the static analysis template 30 (FIG. 4) and a fatigue analysis 116 (FIG. 4) using the fatigue analysis template 32 and the damage tolerance analysis template 34. As indicated above, the analyzer 100 may generate an analysis output 126 (FIG. 4) which may include a summary 128 (FIG. 4) of the margins of safety 130 (FIG. 4) of the structural component 250, strength check notes 134 (FIG. 4), and an analysis results data file 136 (FIG. 4), all of which may be outputted by the input/output device 406. The strength check notes 134 may be generated as textual information which may be printed by a printer or displayed on a display device such as on the same computer having the interface 50.

The structural component optimizer 150 (FIG. 5) may receive the analysis results data file 136 (FIG. 5) from the input/output device 406 of the interface 50. The input/output device 406 (FIG. 17) may be used to submit a selected design variable 154 (FIG. 5) of the structural component 250 for optimization. For example, the input/output device 406 may be used to submit to the optimizer 150 a dimension 314 (FIG. 5) such as a thickness of a portion of the structural component 250. One or more constraints 156 (FIG. 5) may also be submitted to the optimizer 150 using the input/output device 406 as described above. For example, the input/output may be used to provide a value for a minimum margin of safety 130 of the structural component 250. During optimization of the structural component 250, the optimizer 150 may be configured to iteratively update the design variable 154 until the constraint 156 is substantially satisfied 160 as described above.

The optimizer 150 (FIG. 5) may generate an optimization output 168 which may include results of a static optimization 170 (FIG. 5) and results of a fatigue optimization 172 (FIG. 5) of the structural component 250 (FIG. 7). The optimization output 168 (FIG. 5) for each one of the static and fatigue optimizations 170, 172 (FIG. 5) may include a value for the optimized geometry 174 (FIG. 5) and an optimization results data file 178 (FIG. 5) which may be outputted by the input/output device 406 (FIG. 17) of the interface 50 (FIG. 17). The optimization output 168 may be displayed on the display device 410 of the interface 50. Upon approval 180 of the optimized geometry 174 such as by a stress analyst, a design engineer, a manufacturing engineer, or other personnel, the optimized geometry 174 and the optimization results data file 178 may be provided to the structural component analyzer 100 for analysis. The structural component analyzer 100 may determine one or more margins of safety 130 of the structural component 250 based upon the optimized geometry 174.

The system 10 (FIG. 17) may include one or more of the input/output devices 406 (FIG. 17) to facilitate the transfer of data between components that may be connected to the processor-based system 10. The input/output device 406 may be communicatively coupled to the processor-based system 10. The input/output device 406 may facilitate user-input via the interface 50 (FIG. 17) by means of a peripheral device such as a keyboard, a mouse, a joystick, a touch screen and any other suitable device for inputting data from the interface 50 into the processor-based system 10. The input/output device 406 may further include an output device for transferring data representative of the output of the processor-based system 10. For example the input/output device 406 may comprise the display device 410 such as a computer monitor or a computer screen for displaying the analysis results and/or the optimization results 178 generated or processed by the processor-based system 10. The input/output device 406 may optionally include a printer or fax machine for printing a hardcopy of information processed by the processor-based system 10.

In an embodiment, the processor-based system 10 may include one or more of the processors 14 for executing instructions of computable readable program instructions 420 that may be installed into the memory device 400. Alternatively, the processor 14 may comprise a multi-processor core having two or more integrated processors cores. Even further, the processor 14 may comprise a main processor and one or more secondary processors integrated on a chip. The processor 14 may also comprise a many-processor system 10 having a plurality of similarly configured processors.

Referring still to FIG. 17, the processor-based system 10 may further include one or more memory devices 400 which may comprise one or more of volatile or non-volatile storage devices 404. However, the memory device 400 may comprise any hardware device for storing data. For example, the memory device 400 may comprise a random access memory or a cache of the interface 50 and/or integrated memory controller hub which may be included in the communication path 402. The memory device 400 may be configured to permanently and/or temporarily store any one of a variety of different types of data, computer readable code or program instructions 420, or any other type of information. The non-volatile storage device 404 may be provided in a variety of configurations including, but not limited to, a flash memory device, a hard drive, an optical disk, a hard disk, a magnetic tape or any other suitable embodiment for long-term storage. In addition, the non-volatile storage device 404 may comprise a removable device such as a removable hard drive.

Referring still to FIG. 17, the processor-based system 10 may include one or more communications devices 408 to facilitate communication of the processor-based system 10 within a computer network and/or with other processor-based systems. Communication of the processor-based system 10 with a computer network or with other processor-based systems may be by wireless means and/or by hardwire connection. For example, the communications device 408 may comprise a network interface 50 controller to enable wireless or cable communication between the processor-based system 10 and a computer network. The communications device may also comprise a modem and/or a network adapter or any one of a variety of alternative device for transmitting and receiving data.

One or more of the operations of the methodology described above for performing a strength analysis and an optimization of the structural component 250 may be performed by the processor 14 and/or by one or more of the analyzer 100 and the optimizer 150 using the computer readable program instructions 420. The computer readable program instructions 420 may comprise program code of the analysis templates 28 (FIG. 4) which may include computer usable program code and computer readable program code. The computer readable program instructions 420 may be read and executed by the processor 14. The computer readable program instructions 420 may enable the processor 14 to perform one or more operations of the above-described embodiments associated with performing the strength analysis and optimization of the structural component 250.

Referring still to FIG. 17, the computer readable program instructions 420 may include operating instructions for the processor-based system 10 and may further include applications and programs. The computer readable program instructions 420 may be contained and/or loaded onto one or more of memory devices 400 and/or non-volatile storage devices 404 for execution by the processor 14 and/or by analyzer 100 and optimizer 150. As indicated above, one or more of the memory devices 400 and/or non-volatile storage devices 404 may be communicatively coupled to one or more of the remaining components illustrated in FIG. 17 through the communication path 402.

The computer readable program instructions 420 may be contained on tangible or non-tangible computer readable media 414 and which may be loaded onto or transferred to the processor-based system 10 for execution by the processor 14. The computer readable program instructions 420 and the computer readable media 414 comprise a computer program product 412. In an embodiment, the computer readable media 418 may comprise computer readable storage media 416 and/or computer readable signal media 418.

The computer readable storage media 416 may comprise a variety of different embodiments including, but not limited to, optical disks and magnetic disks that may be loaded into a drive, a flash memory device or other storage device or hardware for transfer of data onto a storage device such as a hard drive. The computer readable storage media 416 may be non-removably installed on the processor-based system 10. The computer readable storage media 416 may comprise any suitable storage media and may include, without limitation, a semiconductor system or a propagation medium. In this regard, the computer readable storage media 416 may comprise electronic media, magnetic media, optical media, electromagnetic media, and infrared media. For example, the computer readable storage media 416 may comprise magnetic tape, a computer diskette, random access memory and read-only memory. Non-limiting examples of embodiments of optical disks may include compact disks—read only memory, compact disk-read/write, and digital video disks.

The computer readable signal media 418 may contain the computer readable program instructions 420 and may be embodied in a variety of data signal configurations including, but not limited to, an electromagnetic signal and an optical signal. Such data signals may be transmitted by any suitable communications link including by wireless or hardwire means. For example, the hardwire means may comprise an optical fiber cable, a coaxial cable, a signal wire and any other suitable means for transmitting the data by wireless or by physical means.

Referring still to FIG. 17, the computer readable signal media 418 may facilitate the downloading of the computer readable program instructions 420 to the non-volatile storage or other suitable storage or memory device for use within processor-based system 10. For example, the computer readable program instructions 420 contained within the computer readable storage media 416 may be downloaded to the processor-based system 10 over a computer network from a server or client computer of another system 10.

Any one of a variety of different embodiments of the processor-based system 10 may be implemented using any hardware device or system 10 capable of executing the computer readable program instructions 420. For example, the processor 14 may comprise a hardware unit configured for performing one or more particular functions wherein the computer readable program instructions 420 for performing the functions may be pre-loaded into the memory device 400.

In an embodiment, the processor 14 may comprise an application specific integrated circuit (ASIC), a programmable logic device, or any other hardware device configured to perform one or more specific functions or operations. For example, a programmable logic device may be temporarily or permanently programmed to perform one or more of the operations related to the methodology of analyzing the strength of the structural component 250 (FIG. 7) or optimizing the structural component 250 (FIG. 7) for a given objective such as minimizing weight. The programmable logic device may comprise a programmable logic array, programmable array logic, a field programmable logic array, and a field programmable gate array and any other suitable logic device, without limitation. In an embodiment, the computer readable program instructions 420 may be operated by the one or more processor 14 and/or by other devices including one or more hardware units in communication with the processor 14. Certain portions of the computer readable program instructions 420 may be the processor 14 and other portions of the computer readable program instructions 420 may be run by the hardware units.

Advantageously, the various embodiments of the system 10 and methods described above include the technical feature of executing the strength analysis templates 28 (FIG. 1) on a controlled-access server 12 (FIG. 1) with the technical effect of the repeatability and consistency of the strength analysis process while simultaneously reducing analysis time and reducing structural weight of a structural component 250 (FIG. 7). For example, the various disclosed embodiment include the technical feature of preventing alteration of the static analysis templates 30, the fatigue analysis templates 32, and the damage tolerance analysis templates 34 by a user accessing the templates 28 via the interface 50. The technical effect of preventing alteration of the templates on the server 12 and maintaining control of the templates 28 may include a reduction in the amount of time required to perform a strength analysis of a structural component 250 and a reduction in the amount of time required for auditing and/or certifying the strength analyses performed by users of the templates 28. As indicated above, the system 10 provides the further technical effect of reducing the time required to refine the design of a structural component 250 in response to changes to the load cases 18 (FIG. 1), changes to the analysis templates 28 (FIG. 1), and/or changes to the material allowables 26 (FIG. 1).

For example, the templates may be developed and controlled by a source (e.g., by a manufacturer) and may be tailored or configured for analysis and optimization of a given structural component 250 to be detail-designed, analyzed, and fabricated by a suppler (e.g., a user). By storing the templates 28 on the controlled-access server 12, the templates 28 may advantageously be unalterable or unchangeable by users of the system 10. Different users may execute the templates 28 on the server 12 using one or more interfaces 50 at one or more locations including locations that are remote from the server 12. Each user may be responsible for the design and analysis of substantially similar structural components 250 which may be located at different areas of a structural assembly 250. However, in the system 10 and method disclosed herein, each user advantageously uses the same or substantially similar analysis template 28 for a given structural component 250 which may eliminate from the design schedule the time otherwise required for each user to develop and run their own analysis templates. In this manner, the system 10 and methods disclosed herein may reduce the amount of time required to initiate and complete the strength analysis and detail design of a structural assembly 252. The system 10 and methods may also reduce or eliminate the time required for auditing and/or certifying the individual strength analyses as may be conventionally performed by each supplier.

In addition, the system 10 and method may avoid inconsistent analysis results such as inconsistent margins of safety 130 for substantially similar structural components 250 designed and analyzed by different users using conventional methods. In this manner, the system 10 and method may thereby avoid overly-conservative configurations of the structural component 250 and may instead provide a weight-optimized configuration for the structural component 250. The presently-disclosed embodiments also include the technical feature of storing multiple load cases 18 and multiple material allowables 26 on the server and allowing a user to execute one or more analysis templates 28 using a large number of different load cases 18 in a reduced amount of time as compared to the time required for manual analysis using conventional methods. The technical effect of executing one or more templates 28 with a large number of load cases 18 is an improvement in the strength analysis and the weight optimization of a structural component 250. In addition, the system 10 and methods disclosed herein provide the ability to rapidly generate documentation of such analyses in the form of strength check notes 134 (e.g. stress reports) for review purposes and/or for certification purposes.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of analyzing a structural component, comprising the steps of:
 storing the following on a controlled-access server:
  at least one load case;
  at least one material allowable; and
  an analysis template having at least one analysis variable, the analysis template comprising at least one of a static analysis template, a fatigue analysis template, and a damage tolerance analysis template;
 executing the analysis template stored on the controlled-access server using an interface remote from the server;
 providing, using the interface to the server, at least one entry for the analysis variable;
 performing, using a processor-based analyzer, a strength analysis of the structural component using the analysis template based on the load case and the entry for the analysis variable; and
 determining, using the analyzer, a margin of safety of the structural component based on the material allowable; and
 preventing alteration of the analysis templates such that the static analysis template, the fatigue analysis template, and the damage tolerance analysis template by a user accessing the templates via the interface such that all users use a same or substantially similar analysis template for analyzing a given structural component to reduce the time required to analyze a structural assembly.

2. The method of claim 1 further comprising the step of:
 determining a failure mode of the structural component corresponding to the margin of safety.

3. The method of claim 2 further comprising the step of:
 determining at least one load case and a related environment associated with the margin of safety.

4. The method of claim 1 wherein the step of providing an entry for the analysis variable comprises:
 selecting a geometry parameter of the structural component.

5. The method of claim 1 further comprising the steps of:
 storing a listing of materials and corresponding material allowables on the server;
 selecting, using the interface, at least one of the materials as an entry for the analysis variable; and
 performing, using an optimizer, the strength analysis using the material allowable of a selected material.

6. The method of claim 1 further comprising the steps of:
 storing a plurality of load cases on the server; and
 selecting, using the interface, one of the load cases for the strength analysis.

7. The method of claim 1 wherein the step of performing the strength analysis using the analyzer comprises at least one of the following:
 performing a static analysis of the structural component using the static analysis template; and
 performing a fatigue analysis of the structural component using the fatigue analysis template and the damage tolerance analysis template.

8. The method of claim 1 further comprising the steps of:
 selecting, using the interface, at least one design variable of the structural component for optimization thereof;
 entering, using the interface, at least one constraint of the structural component into a processor-based optimizer;
 performing, using the optimizer, an optimization of the design variable by iteratively updating the design variable until the constraint is substantially satisfied; and
 determining, using the optimizer, an optimized geometry of the structural component based on the optimization of the design variable.

9. The method of claim 8 wherein:
 the design variable comprises a geometry parameter of the structural component.

10. The method of claim 9 wherein:
 the geometry parameter comprises a thickness of the structural component.

11. The method of claim 8 wherein:
 the constraint comprises a minimum value for the margin of safety.

12. The method of claim 8 further comprising the step of:
 determining a failure mode of the optimized geometry and a margin of safety corresponding to the failure mode.

13. The method of claim 12 further comprising the step of:
 determining at least one load condition and a related environment associated with the margin of safety.

14. The method of claim 8 wherein:
 the optimization of the structural component comprises at least one of a static optimization and a fatigue optimization respectively based on a static analysis and a fatigue analysis of the structural component.

15. The method of claim 8 wherein the step of determining an optimized geometry comprises:
 determining a minimum thickness of at least one portion of the structural component.

16. A method of analyzing a structural component, comprising the steps of:
storing the following on a controlled-access server:
at least one load case;
at least one material allowable; and
an analysis template having at least one analysis variable, the analysis template comprising at least one of a static analysis template, a fatigue analysis template, and a damage tolerance analysis template;
executing the analysis template stored on the controlled-access server using an interface remote from the server;
providing, using the interface to the server, at least one entry for the analysis variable;
performing, using a processor-based analyzer, a strength analysis of the structural component using the analysis template based on the load case and the entry for the analysis variable;
determining, using the analyzer, a margin of safety of the structural component based on the material allowable;
providing, using the interface, a design variable and a constraint of the structural component;
performing, using a processor-based optimizer, an optimization of the design variable by iteratively updating the design variable until the constraint is substantially satisfied; and
determining, using the optimizer, an optimized geometry of the structural component based on the optimization of the design variable; and
preventing alteration of the analysis templates such that the static analysis template, the fatigue analysis template, and the damage tolerance analysis template by a user accessing the templates via the interface such that all users use a same or substantially similar analysis template for analyzing a given structural component to reduce the time required to analyze a structural assembly.

17. A processor-based system for analyzing a structural component, comprising:
a controlled-access server configured to store the following:
at least one load case;
at least one material allowable; and
an analysis template having at least one analysis variable, the analysis template comprising at least one of a static analysis template, a fatigue analysis template, and a damage tolerance analysis template;
an interface to the server, the interface being configured to execute the analysis template stored on the controlled-access server and facilitate a user providing an entry for the analysis variable; and
a structural component analyzer configured to perform a strength analysis of the structural component using the analysis template based on the load case and the entry for the analysis variable;
the structural component analyzer being configured to determine a margin of safety of the structural component based on the material allowable; and
preventing alteration of the analysis templates such that the static analysis template, the fatigue analysis template, and the damage tolerance analysis template by a user accessing the templates via the interface such that all users use a same or substantially similar analysis template for analyzing a given structural component to reduce the time required to analyze a structural assembly.

18. The system of claim 17 wherein:
the entry comprises a geometry parameter of the structural component.

19. The system of claim 17 wherein:
the server is configured to store a plurality of the load cases; and
the interface being configured to facilitate a selection of one of the load cases for the strength analysis.

20. The system of claim 17 wherein:
the server is configured to store a listing of materials and corresponding material allowables; and
the interface being configured to facilitate a selection of at least one of the materials as an entry for the analysis variable.

21. The system of claim 17 further comprising:
a structural component optimizer;
the interface being configured to facilitate entry of at least one design variable and at least one constraint into the optimizer;
the structural component optimizer being configured to iteratively update the design variable until the constraint is substantially satisfied; and
the structural component optimizer being configured to determine an optimized geometry of the structural component based on the optimization of the design variable.

22. The system of claim 17 wherein:
at least one design variable comprises a thickness of the structural component; and
at least one constraint comprises a minimum value for the margin of safety.

* * * * *